(12) United States Patent
Yamaoka et al.

(10) Patent No.: US 12,150,404 B2
(45) Date of Patent: Nov. 26, 2024

(54) MOWER

(71) Applicant: Nanjing Chervon Industry Co., Ltd., Nanjing (CN)

(72) Inventors: Toshinari Yamaoka, Nanjing (CN); Fangjie Nie, Nanjing (CN); Yang Nie, Nanjing (CN); Long Li, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 742 days.

(21) Appl. No.: 17/366,713

(22) Filed: Jul. 2, 2021

(65) Prior Publication Data

US 2021/0329832 A1 Oct. 28, 2021

Related U.S. Application Data

(63) Continuation of application No. PCT/CN2020/070274, filed on Jan. 3, 2020.

(30) Foreign Application Priority Data

| Jan. 4, 2019 | (CN) | 201910008048.X |
| Apr. 24, 2019 | (CN) | 201910331589.6 |
| Nov. 15, 2019 | (CN) | 201911116692.5 |
| Nov. 15, 2019 | (CN) | 201921972722.8 |
| Nov. 15, 2019 | (CN) | 201921973061.0 |
| Nov. 15, 2019 | (CN) | 201921982911.3 |

(51) Int. Cl.
  *A01D 34/47* (2006.01)
  *A01D 34/00* (2006.01)
  (Continued)

(52) U.S. Cl.
  CPC .......... *A01D 34/006* (2013.01); *A01D 69/02* (2013.01); *A01D 2101/00* (2013.01)

(58) Field of Classification Search
  CPC ........ A01D 69/08; A01D 69/02; A01D 34/69; A01D 34/006; A01D 34/6806;
  (Continued)

(56) References Cited

U.S. PATENT DOCUMENTS 9,538,699 B1 * 1/2017 Bejcek ................ A01D 34/69
2007/0256401 A1 11/2007 Hibi et al.
(Continued)

FOREIGN PATENT DOCUMENTS

| CN | 1406462 A | 4/2003 |
| CN | 1589601 A | 3/2005 |

(Continued)

OTHER PUBLICATIONS

ISA/CN, Int. Search Report issued on PCT application No. PCT/CN2020/070274, dated Mar. 27, 2020, 2 pages.

*Primary Examiner* — Thomas B Will
*Assistant Examiner* — Robert E Pezzuto
(74) *Attorney, Agent, or Firm* — Greenberg Traurig, LLP

(57) ABSTRACT

A mower includes an electric motor, a main machine body, an electronic component, and an operating assembly. The main machine body extends in a forward-backward direction. The operating assembly includes a handle assembly and a first operating member. The handle assembly is rotatably connected to the main machine body and configured to be held to operate the mower to run. The first operating member is rotatably connected to the handle assembly to control a walking state of the mower. The first operating member is formed with a fitting surface fitting with the handle assembly. In response to the first operating member being operated to rotate and approach the handle assembly, the fitting surface is capable of substantially fitting flush with the handle assembly to form a unitary component that is capable of being held.

17 Claims, 29 Drawing Sheets

(51) Int. Cl.
*A01D 34/52* (2006.01)
*A01D 69/02* (2006.01)
*A01D 101/00* (2006.01)

(58) Field of Classification Search
CPC ...... A01D 34/82; A01D 34/68; A01D 34/828;
A01D 34/824; A01D 33/028; A01D
75/006; A01D 2101/00; F16H 59/04;
F16H 59/06
See application file for complete search history.

(56) References Cited

U.S. PATENT DOCUMENTS

| | | | |
|---|---|---|---|
| 2010/0218385 A1 | 9/2010 | Mang et al. | |
| 2017/0367259 A1 | 12/2017 | Shaffer et al. | |
| 2018/0077862 A1* | 3/2018 | Smith | A01D 34/6806 |
| 2018/0146617 A1* | 5/2018 | Oota | A01D 34/824 |

FOREIGN PATENT DOCUMENTS

| | | | |
|---|---|---|---|
| CN | 1711821 | A | 12/2005 |
| CN | 202476097 | U | 10/2012 |
| CN | 105917861 | A | 9/2016 |
| CN | 105940870 | A | 9/2016 |
| CN | 106171253 | A | 12/2016 |
| CN | 106258180 | A | 1/2017 |
| CN | 108464104 | A | 8/2018 |
| CN | 108666476 | A | 10/2018 |
| CN | 108777940 | A | 11/2018 |
| CN | 108790946 | A | 11/2018 |
| CN | 208191447 | U | 12/2018 |
| GB | 2297889 | A | 8/1996 |

\* cited by examiner

MOWER

RELATED APPLICATION INFORMATION

The present application is a continuation of International Application Number PCT/CN2020/070274, filed on Jan. 3, 2020, through which this application also claims the benefit under 35 U.S.C. § 119(a) of Chinese Patent Application No. 201910008048.X, filed Jan. 4, 2019, Chinese Patent Application No. 201910331589.6, field Apr. 24, 2019, Chinese Patent Application No. 201921982911.3, field Nov. 15, 2019, Chinese Patent Application No. 201921972722.8, field Nov. 15, 2019, Chinese Patent Application No. 201911116692.5, field Nov. 15, 2019, and Chinese Patent Application No. 201921973061.0, field Nov. 15, 2019, which applications are incorporated herein by reference in their entirety.

BACKGROUND

As a garden tool, a mower is a mechanical tool configured to mow lawns, vegetation, and the like. The mower is composed of a chipper disk, an engine, a walking wheel, a walking mechanism, a cutting knife, a handrail, and a control part. The chipper disk is mounted on the walking wheel and mounted with the engine, and an output shaft of the engine is mounted with the cutting knife. The cutting knife utilizes high-speed rotation of the engine so that the speed is greatly improved and the operation time of weeding workers is saved, thereby saving a large amount of human resources.

In the related art, some mowers generally have more operating structures since the mowers need to satisfy the cutting function and the self-propelled function at the same time. How to comfortably operate the operating structure and effectively control the operating state of the mower when the mower is operated are technical problems to be solved urgently by those skilled in the art.

SUMMARY

An example provides a mower. The mower includes an electric motor, a main machine body, an electronic component, and an operating assembly. The electric motor is configured to drive a mowing element to rotate for mowing. The main machine body is configured for the electric motor to be mounted and configured to extend in a forward-backward direction. The electronic component is electrically connected to the electric motor and configured to control power output of the mower. The operating assembly is operable for control of walking and the power output of the mower. The operating assembly includes a handle assembly and a first operating member. The handle assembly is rotatably connected to the main machine body and configured to be held to operate the mower to run. The first operating member is rotatably connected to the handle assembly to control a walking state of the mower. The first operating member is formed with a fitting surface fitting with the handle assembly, and in response to the first operating member being operated to rotate and approach the handle assembly, the fitting surface is capable of substantially fitting with the handle assembly to form an integral that is capable of being held.

In one example, the first operating member includes a contact portion, the fitting surface is disposed at the contact portion, the handle assembly includes a hold portion, and in response to the fitting surface being in contact with the handle assembly, the fitting surface fits with the hold portion.

In one example, the contact portion includes a bent region and a straight line region, and an included angle between an extension direction of the bent region and an extension direction of the straight line region is greater than or equal to 20° and less than or equal to 30°.

In one example, the operating assembly further includes a speed regulator, the speed regulator is provided with a connection end, and a distance between the connection end and a tail end of a speed regulator body facing away from the connection end is greater than or equal to 20 mm and less than or equal to 25 mm.

In one example, the operating assembly further includes a second operating member rotatably connected to the handle assembly, and the second operating member is disposed on a front side of the first operating member.

In one example, the main machine body is further formed with a support leg configured to support the mower, and the support leg is disposed at a back side of the main machine body.

In one example, the mower further includes a walking assembly for the mower to walk, the walking assembly includes a first walking wheel and a second walking wheel, and the second walking wheel is disposed behind the first walking wheel.

In one example, a backmost end of the support leg is substantially flush with a backmost end of the second walking wheel in a plane perpendicular to the forward-backward direction.

In one example, the operating assembly is rotatably connected to the main machine body, and the main machine body is further formed with a first limiting portion for limiting rotation of the operating assembly.

In one example, the operating assembly further includes a connection rod for connecting the handle assembly and the first operating member, and the connection rod extends along a second linear direction parallel to an axis direction of the connection rod and is provided with a telescopic portion for adjusting a length of the connection rod; and the connection rod further includes an adjusting member for adjusting a telescopic state, and the adjusting member is configured to rotate around a rotational shaft perpendicular to the second linear direction.

An example provides a mower. The mower includes an electric motor, a main machine body, and an electronic component. The electric motor is configured to drive a mowing element to rotate for mowing. The main machine body is configured for the electric motor to be mounted and configured to extend in a forward-backward direction. The electronic component is electrically connected to the electric motor and configured to control power output of the mower. The main machine body is formed with a first accommodation space for accommodating the electronic component and a second accommodation space for accommodating the electric motor, and the first accommodation space communicates with the second accommodation space. An output end of the electric motor is further connected to or formed with a fan, and in response to the electric motor rotating, the fan is configured to generate heat dissipation wind and the heat dissipation wind is capable of flowing from the first accommodation space to the second accommodation space and finally flows out from the second accommodation space.

In one example, the mower further includes a seal plate configured to seal at least a portion of the first accommodation space or at least a portion of the second accommodation space, and the seal plate and the main machine body are fixedly connected to each other or integrally formed.

In one example, an air inlet for the heat dissipation wind to enter is further formed between the seal plate and the main machine body.

In one example, the electronic component is disposed at two sides of the air inlet in the first accommodation space.

In one example, the electronic component is disposed at two ends of the first accommodation space and capable of cooperating with the air inlet to form a passage for the heat dissipation wind to flow.

In one example, the main machine body is formed, at a position where the fan is connected to the electric motor, with an air outlet for the heat dissipation wind to flow out.

In one example, after flowing through the electronic component, the heat dissipation wind is capable of flowing through the electric motor and flowing out from the air outlet.

In one example, the electric motor is a brushless electric motor of an outer rotor type.

In one example, the fan is disposed between the electric motor and the mowing element.

In one example, the air inlet is disposed at a back side of the first accommodation space on the main machine body.

An example provides a mower. The mower includes an electric motor, a main machine body, and an electronic component. The electric motor is configured to drive a mowing element to rotate for mowing. The main machine body is configured for the electric motor to be mounted and configured to extend in a forward-backward direction. The electronic component is electrically connected to the electric motor and configured to control power output of the mower. The mower includes a grass collecting mode, and in response to the mower being in the grass collecting mode, the mower is connected to a grass collecting basket for collecting grass and a dust cover connected to the mower and cooperating with the grass collecting basket. An interface between the dust cover and the grass collecting basket is formed with or connected to a guide portion and a first stop portion.

In one example, the guide portion is recessed from an outer wall to an inner wall of the dust cover and protrudes from the interface at the inner wall of the dust cover.

In one example, the guide portion is smooth and continuous and capable of guiding grass chips away from the interface and into the grass collecting basket.

In one example, the first stop portion is disposed at a back side of the guide portion.

In one example, the mower further comprises a grass chopping mode, and the mower further includes a back cover adjustable to be in the grass chopping mode.

In one example, the mower further includes an upper housing for sealing at least a portion of the main machine body, and the upper housing is further formed with a mounting seat for a battery pack to be mounted.

In one example, the mounting seat is formed with a slide rail connected to the upper housing.

The upper housing is formed with a guide rail which cooperates with the slide rail to move.

In response to the guide rail sliding into the slide rail, the mounting seat is capable of being connected to the upper housing into an integral.

In one example, the mounting seat is connected to a power supply interface, and the power supply interface is detachably connected to the mounting seat.

In one example, the power supply interface is formed with a first engagement portion, the mounting seat is formed with a second engagement portion, and in response to the power supply interface being mounted to the mounting seat in a first direction, the power supply interface is capable of being limited from being separated from the mounting seat in a direction intersecting the forward-backward direction in response to the first engagement portion cooperating with the second engagement portion.

In one example, the mounting seat is further formed with a second stop portion that limits the power supply interface from being separated from the mounting seat in a direction away from the first direction.

An example provides a mower. The mower includes a first electric motor, a main machine body, an electronic component, an operating assembly, and a walking assembly. The first electric motor is configured to drive a mowing element to rotate for mowing. The main machine body is configured for the first electric motor to be mounted and configured to extend in a forward-backward direction. The electronic component is electrically connected to the first electric motor and configured to control power output of the mower. The operating assembly is operable for control of walking and the power output of the mower. The walking assembly is configured to be connected to the main machine body. The walking assembly is connected to a second electric motor configured to drive the walking assembly to move. The mower further includes a housing for the second electric motor to be mounted. The housing is formed with an accommodation space for accommodating the second electric motor, and at least part of heat generated by the second electric motor during operation is dissipated through heat exchange between the housing and an outside.

In one example, the housing includes a first housing portion and a second housing portion, and the first housing portion is combined with the second housing portion to form the accommodation space.

In one example, the first housing portion is further formed with or connected to a mounting groove configured to for the second electric motor to be mounted.

In one example, the first housing portion and the second housing portion form a heat dissipation rib for heat dissipation.

In one example, the mower further includes a fan connected to the second electric motor, and the fan is disposed in the accommodation space.

In one example, a volume of the accommodation space is greater than a volume of the second electric motor.

In one example, a third accommodation space does not communicate with an external space.

In one example, the main machine body is further formed with a front handle capable for transportation, and the front handle is disposed on a side of the main machine body facing away from the operating assembly.

In one example, the main machine body is further connected to or formed with a back handle cooperating with the front handle.

An example provides a mower. The mower includes a first electric motor, a main machine body, an electronic component, an operating assembly, and a walking assembly. The first electric motor is configured to drive a mowing element to rotate for mowing. The main machine body is configured for the first electric motor to be mounted and configured to extend in a forward-backward direction. The electronic component is electrically connected to the first electric motor and configured to control power output of the mower. The operating assembly is operable for control of walking and the power output of the mower. The walking assembly is configured to be connected to the main machine body. The walking assembly is connected to a second electric motor configured to drive the walking assembly to move. The mower further includes a housing for the second electric motor to be mounted. The housing is formed with at least one heat dissipation hole, the at least one heat dissipation hole is disposed on an outer wall of the housing which enables suction air and exhaust air of the second electric motor not to form an airflow, and at least part of heat generated by the second electric motor during operation is dissipated through heat exchange between the at least one heat dissipation hole and an outside.

The operating member is disposed on the operating assembly capable of fitting with the handle so that it is convenient for a user to hold and the operation convenience is increased.

DETAILED DESCRIPTION

Figure 1:
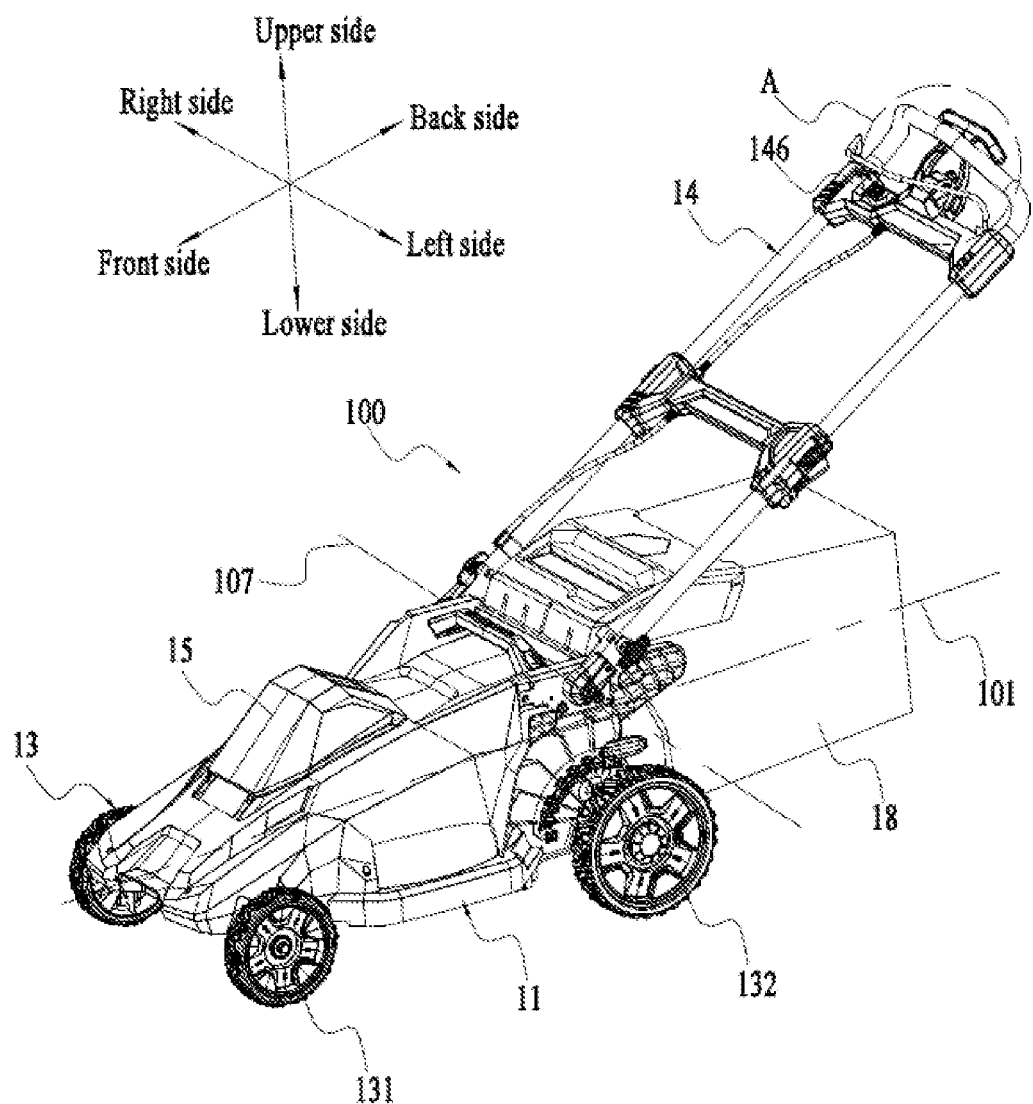
FIG. 1 is a perspective view of a mower according to a first example.
Figure 2:
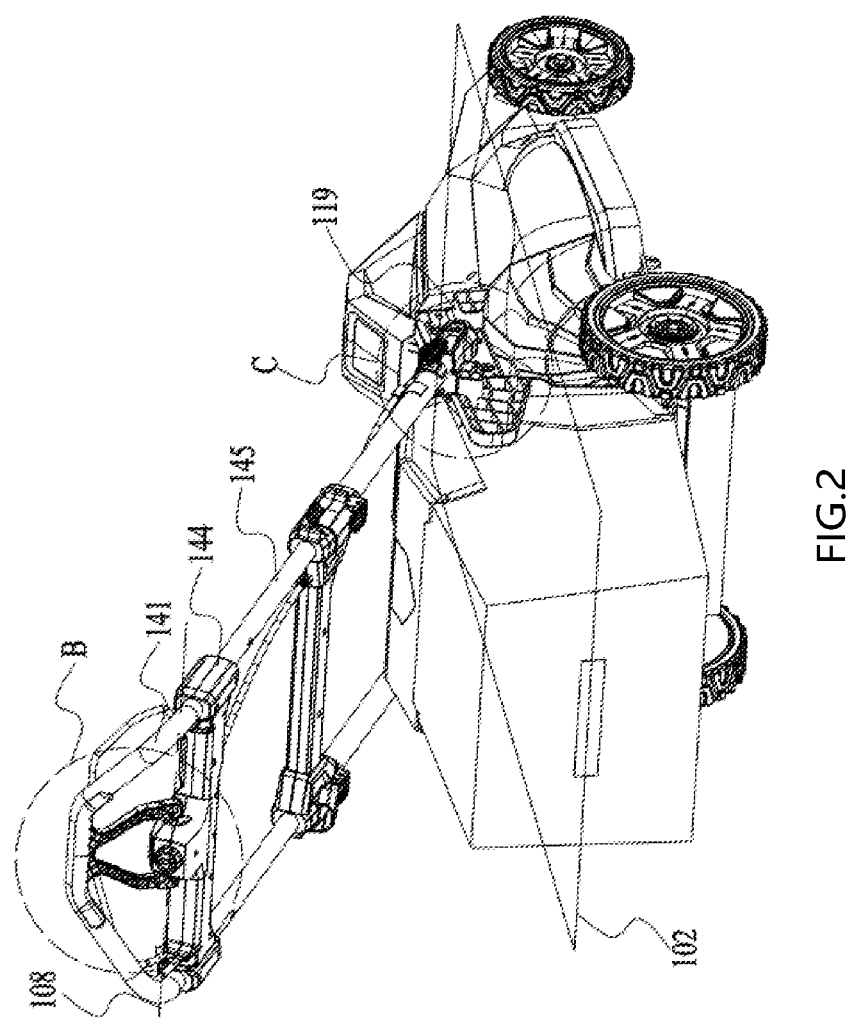
FIG. 2 is a perspective view of the mower of FIG. 1 from another viewing angle.
Figure 3:
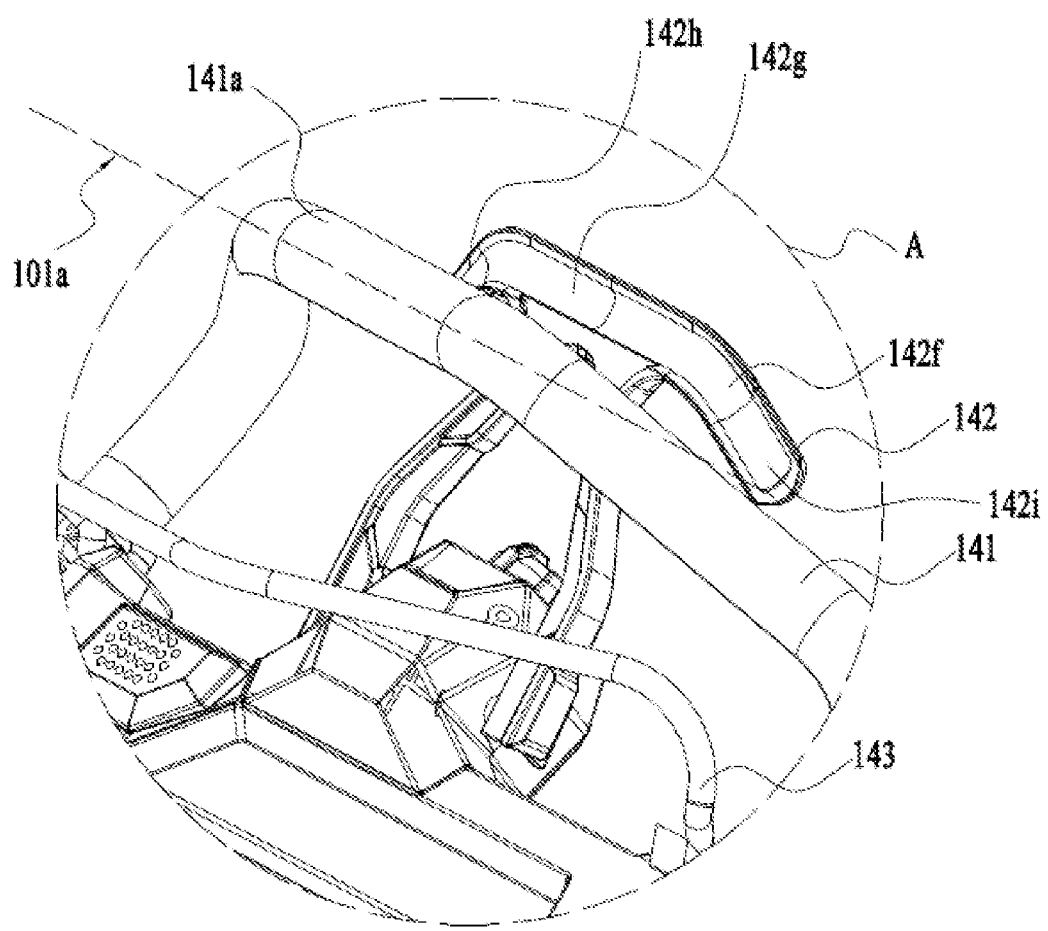
FIG. 3 is a partial enlarged view of a part A of the mower of FIG. 1.
Figure 4:
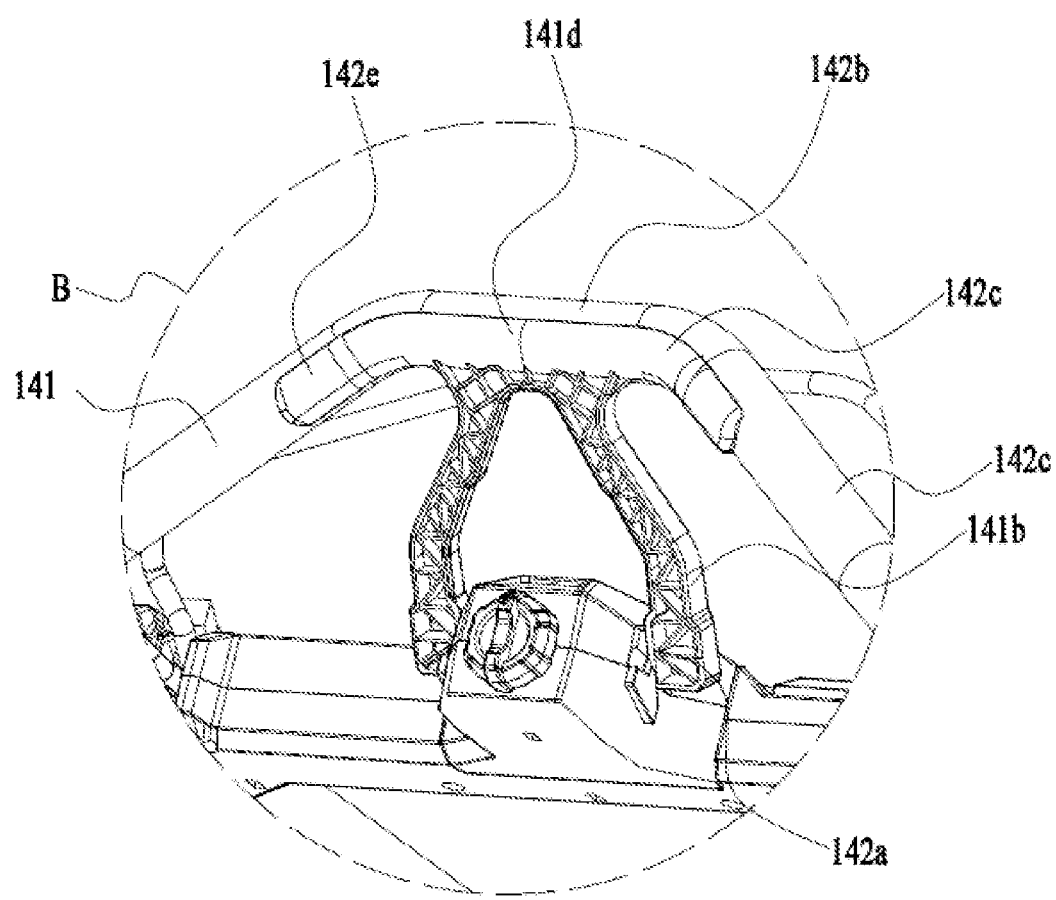
FIG. 4 is a partial enlarged view of a part B of the mower of FIG. 2.

A mower 100 shown in FIG. 1 can be manually manipulated by a user to mow lawns, vegetation, and the like. The mower 100 includes a main machine body 11, a power output assembly 12 (not shown in the figure), a walking assembly 13, an operating assembly 14, and a power supply device 15. The main machine body 11 is configured for the power output assembly 12, the walking assembly 13, the operating assembly 14, and the power supply device 15 to be mounted. The main machine body 11 extends at least partially along a first linear direction 101 parallel to a forward-backward direction, and the above components and devices are reasonably distributed to a plurality of positions of the main machine body 11.

Figure 14:
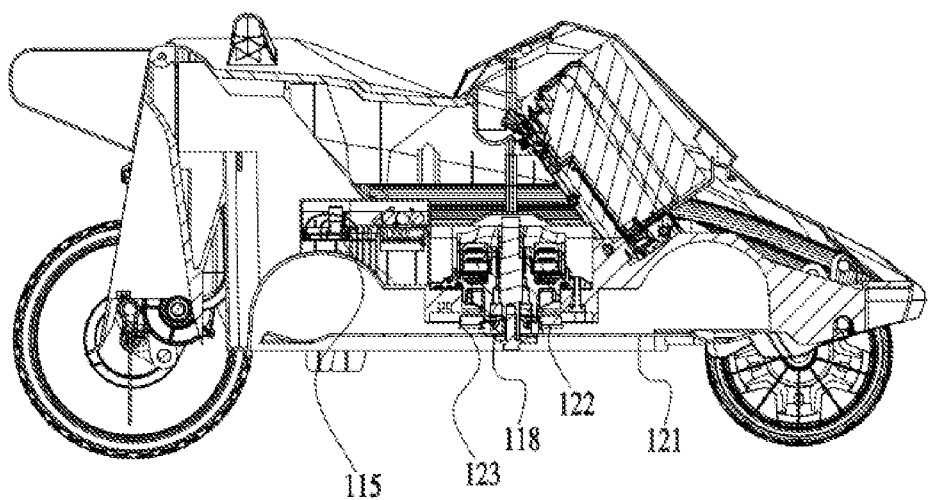
FIG. 14 is a sectional view of the mower of FIG. 6.

As shown in FIGS. 1 and 14, the power output assembly 12 is mounted to the main machine body 11 and includes an output member configured to output power to implement the function of mowing and a motor 122. In this example, the output member may be a mowing element 121. The motor 122 is configured to drive the mowing element 121 to rotate to cut the vegetation. The main machine body 11 is formed with an accommodation space for accommodating at least a portion of the motor 122 and a portion of the mowing element 121. The power output assembly 12 may include more than one mowing element 121, and correspondingly, the number of motors 122 may correspond to the number of mowing elements 121. In an optional example, the motor 122 is an electric motor. The motor 122 may also be referred to as a self-propelled electric motor. A hand-push mower 100 further includes a battery pack 151 that supplies power to the motor 122. In an optional example, the motor 122 may also be an internal combustion engine powered by fuel combustion.

The walking assembly 13 is configured to enable the mower 100 to walk on the lawn. The walking assembly 13 may include a first walking wheel 131 and a second walking wheel 132. In the forward-backward direction, the first walking wheel 131 is disposed in front of the second walking wheel 132. In this example, the number of first walking wheels 131 is two, and the number of second walking wheels 132 is also two.

As shown in FIGS. 1 to 4, the operating assembly 14 is configured to be operated by a user to control walking and power output of the mower 100. The operating assembly 14 may include a handle assembly 141, a first operating member 142, a second operating member 143, and a connection housing 144. The user operates the operating assembly 14 to control the output power, a walking path and a walking state of the mower 100. The operating assembly 14 is rotatably connected to the main machine body 11 and is rotatable around a first rotational shaft 107 for adjustment to a suitable angle by the user so that the requirements for uses by users of different heights can be satisfied. The connection housing 144 is connected between two connecting rods 145 of the operating assembly 14. The first operating member 142 is also rotatably connected to the handle assembly 141 and is rotatable about a second rotational shaft 108. The second operating member 143 is also rotatably connected to the handle assembly 141 and is rotatable about a third rotational shaft (not shown in the figure). In addition, an external structure of the second operating member 143 has a same shape as a hold portion 141a of the handle assembly 141 so that when the user pulls the second operating member 143, the second operating member 143 can substantially fit with the hold portion 141a of the handle assembly 141, thereby facilitating holding for a long period of time. In addition, the operating assembly 14 further includes a lock switch 146 for preventing the user from mistakenly starting the mower 100. The lock switch 146 may be disposed outside a rotation track range of the second operating member 143 to avoid interference between the second operating member 143 and the lock switch 146 when the second operating member 143 and the lock switch 146 are operated. The lock switch 146 is disposed on the connection housing 144 and cooperates with the second operating member 143 to start the mower 100 for operating. In this example, there is no sequential order for operation of the second operating member 143 and operation of the lock switch 146. That is, whether the user firstly operates the second operating member 143 and then operates the lock switch 146 or firstly operates the lock switch 146 and then operates the second operating member 143, the mower 100 can be started. Therefore, the lock switch 146 can be disposed at any position of the connection housing 144 as long as the lock switch 146 does not interfere with the second operating member 143.

In order to clearly explain the technical solutions of the present application, the front side, the back side, the left side, the right side, the upper side and the lower side shown in FIG. 1 are further defined. In a direction in which the user pushes the mower 100 to operate forward, the second operating member 143 is disposed on the front side of the hold portion 141a of the handle assembly 141, and the first operating member 142 is disposed on the back side of the hold portion 141a, that is, the user operates the first operating member 142 through a thumb and operates the second operating member 143 through other fingers other than the thumb. In this example, when the user pushes through the handle assembly 141 the mower 100 to operate, it is necessary to control the second operating member 143 or the first operating member 142 at the same time. When the user operates the first operating member 142, the thumb pulls the first operating member 142 to rotate to a position close to the hold portion 141a, and pulling the first operating member 142 to rotate to the hold portion 141a is a continuous action, that is, the user needs to pull the first operating member 142 all the time, and it is strenuous to pull the first operating member 142 with the thumb for a long period of time. Therefore, in this example, the first operating member 142 is provided as a member that can completely fit with the hold portion 141a.

As shown in FIGS. 1 to 5, the hold portion 141a is a cylindrical structure prefabricated into a preset shape, and an outer surface of the hold portion is cylindrical. Moreover, in order to satisfy the working requirements of the mower 100, the hold portion 141a is made of a hard material that is not easy to deform so that the structural strength of the whole handle assembly 141 can be ensured, thereby enabling the user to operate the mower 100 more stably and safely. The first operating member 142 is made of a material with relatively high plasticity relative to the handle assembly 141 and includes a connection portion 142a, two main body portions 142b, and a contact portion 142c. The connection portion 142a is configured to connect the first operating member 142 to the handle assembly 141 and be rotatably connected to the handle assembly 141. The main body portions 142b extends from the connection portion 142a to form a complete framework of the first operating member 142. The contact portion 142c extends from the main body portions and is finally in contact with the hold portion 141a when the user pulls the first operating member 142 to rotate.

The contact portion 142c further includes two regions, that is, a straight line region 142d extending in a left-right direction and a bent region 142e intersecting the straight line region 142d. An included angle between an extension direction of the bent region 142e and an extension direction of the straight line region 142d is greater than or equal to 20° and less than or equal to 30°. In this example, the included angle α between the bent region 142e and the straight line region 142d is 25°. A length L1 of the contact portion 142c as a whole in the left-right direction is 200 mm. An initial included angle between the first operating member 142 and the handle assembly is 30°. Under the setting of this angle, on the one hand, the first operating member 142 has a preset travel range and has a larger adjustment range; and on the other hand, a distance between the first operating member 142 and the handle assembly is not so large that the user cannot hold the first operating member with one hand.

Figure 5:
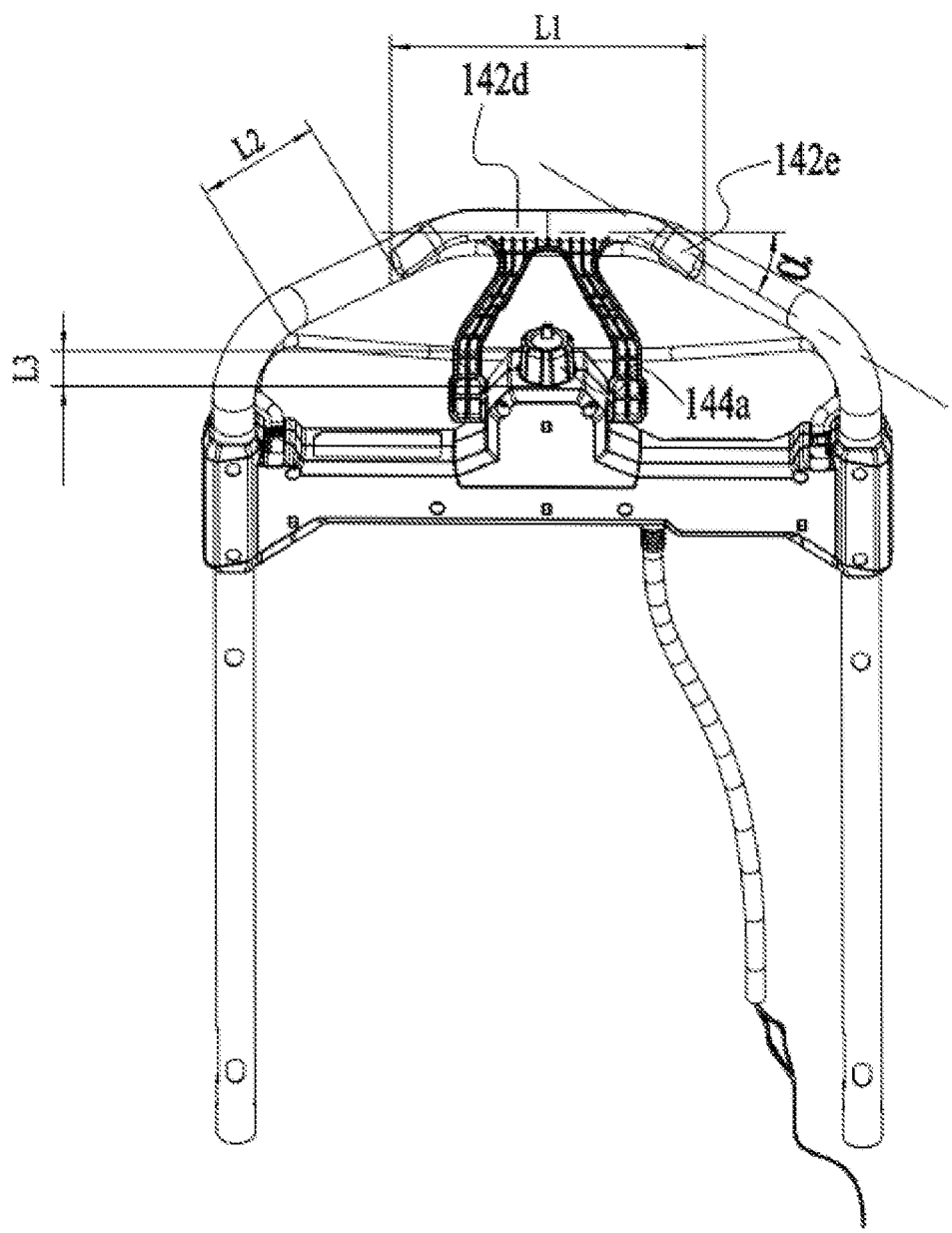
FIG. 5 is a planar view of an operating assembly of the mower of FIG. 1.

The contact portion 142c is formed with a fitting surface 142f that can fit with the hold portion 141a. The fitting surface 142f is an arc surface that can substantially fit with the outer surface of the hold portion 141a and is recessed in a direction away from the hold portion 141a. When the user pulls the first operating member 142 to rotate to the hold portion 141a, the first operating member 142 can substantially fit flush with the hold portion 141a, and the hold portion and the first operating member can form a whole under the continuous holding of the user so that the operation fatigue of the user caused by pulling of the first operating member 142 by the thumb for a long period of time can be avoided. That is, when the user pulls the first operating member 142 to the hold portion 141a, the first operating member 142 fits with the hold portion 141a, and at this time, the user does not need to pull the first operating member 142 again but uses the thumb to form a holding operation to hold the first operating member 142 and the hold portion 141a as a whole. At this time, the user does not need to pull the first operating member 142 by the thumb for a long period of time when the user operates the first operating member 142, and the user does not feel tired so that the operation experience is good. After the first operating member 142 fits with the hold portion 141a, the hold portion 141a further has a non-fitting region. As shown in FIG. 5, a distance between the non-fitting region and a fitting region is L2, the non-fitting region is a straight line region, and the user can manipulate the second operating member 143 while holding the non-fitting region. In this example, L2 is greater than or equal to 30 mm and less than or equal to 100 mm. The user can hold the hold portion with three or four fingers at the non-fitting region so that the second operating member 143 can be synchronously controlled by the index finger or the thumb.

The operating assembly 14 further includes a speed regulator 144a mounted on the connection housing 144, and the speed regulator 144a is disposed between two connection portions 142a. The speed regulator 144a is disposed between the main body portions 142b. The speed regulator 144a has a connection end connected to the connection housing 144, and a distance L3 between the connection end and a tail end of the body of the speed regulator 144a in a height direction is greater than or equal to 20 mm and less than or equal to 25 mm. Within this length range, it is more convenient for the user to operate the speed regulator 144a, and the length is more suitable for the user to hold. That is to say, the length L3 of the portion of the speed regulator 144a can be operated is greater than or equal to 20 mm and less than or equal to 25 mm.

As shown in FIGS. 1 to 5 and FIG. 30, the hold portion 141a includes an intermediate portion 141b extending in the left-right direction, the intermediate portion 141b is a cylinder, and the center line 101a of the cylinder extends in the left-right direction. The hold portion 141a further includes a first connecting portion 141c connected with the intermediate portion 141b and one of the two connecting rods 145 and a second connecting portion 141d connected with the other one of the two connecting rods 145. The fitting surface 142f includes an intermediate fitting surface 142g which is in contact with the hold portion 141a, a first fitting surface 142h and a second fitting surface 142i arranged at both ends of the intermediate fitting surface 142g. The first fitting surface 142h is connected with the first connecting portion 141c, and the second fitting surface 142i is connected with the second connecting portion 141d. The cross-sectional line of the intermediate fitting surface 142g in a plane perpendicular to the center line 101a is a circular arc, and the center angle A1 corresponding to the circular arc is greater than or equal to 30 degrees and less than or equal to 180 degrees. The fitting surface 142f is arranged on the back side of the hold portion 141a.

Figure 6:
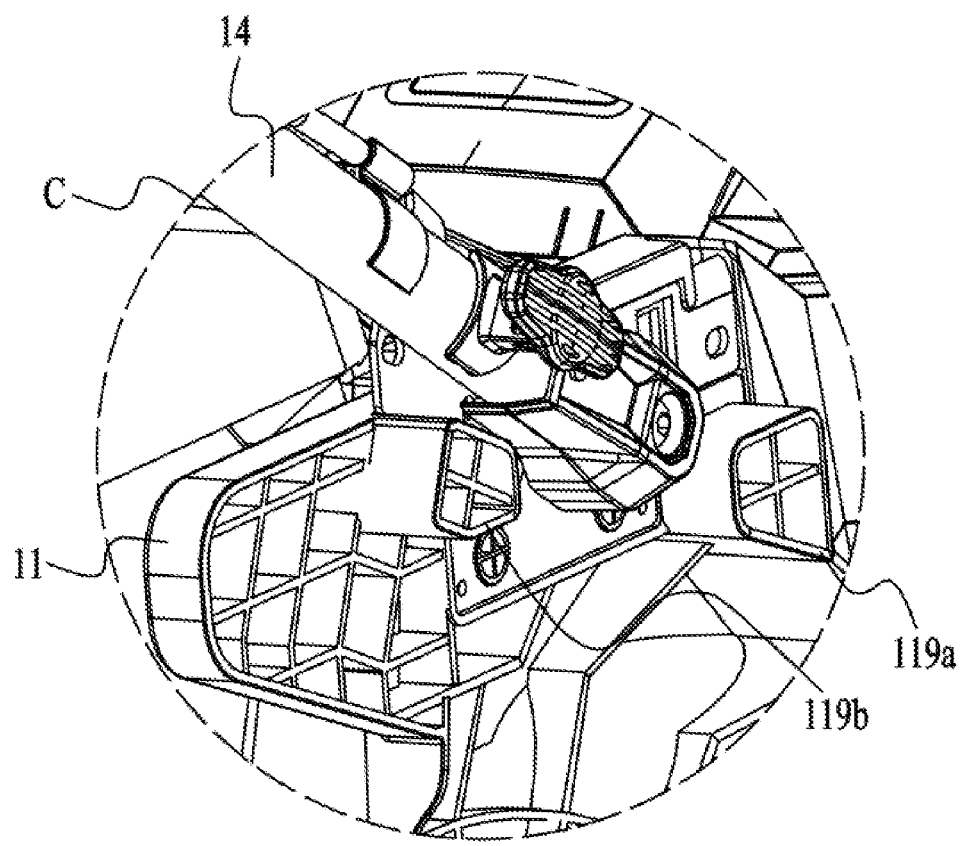
FIG. 6 is a partial enlarged view of a part C of the mower of FIG. 2.

When the user operates the mower 100 to run, the operating assembly 14 of the mower 100 can be rotated to a suitable angle on the back side of the forward direction of the mower 100. At this time, the user can operate the operating assembly 14 to control the mower 100 for running. As shown in FIG. 6, the main machine body 11 is further formed with or connected to a first limiting assembly 119 for stopping the operating member 14. A joint of the main machine body 11 and the operating assembly 14 has an extension region perpendicular to the left-right direction, and the extension region is substantially located in one plane. As defined herein, the main machine body 11 extending in the extension region is not limited to the main machine body 11 being completely flat in the extension region; even if a small number of grooves or protrusions that substantially do not affect the flatness of the extension region exist, it is also considered that the main machine body 11 is in the extension region. The first limiting assembly 119 extends in the left-right direction and protrudes from the plane where the extension region is located. In one example, the first limiting assembly 119 protrudes from the plane where the extension region is located so that the first limiting assembly 119 has affected the flatness of the extension region, and the such protrusion does not belong to the above-mentioned protrusion or groove that does not affect the flatness of the extension region. When the operating assembly 14 is rotated to the first limiting assembly 119 in a preset direction, the operating assembly 14 cannot be selectively rotated due to the stop of the first limiting assembly 119, so the operating assembly 14 is limited to a limit position where the first limiting assembly 119 is located. In this manner, the operating assembly 14 can be prevented from unconsciously colliding with other parts of the mower 100 and thus causing damage while the user rotates the operating assembly 14. In this example, the first limiting assembly 119 includes a first limiting portion 119a and a second limiting portion 119b. The first limiting portion 119a is disposed at a front side of the joint of the operating assembly 14 and the main machine body 11, and the second limiting portion 119b is disposed at a back side of the joint of the operating assembly 14 and the main machine body 11. The rotation of the operating assembly 14 can be limited within a preset range through the cooperation between the first limiting portion 119a and the second limiting portion 119b so that the damage to the main machine body 11 or other parts connected to the main machine body 11 caused by misoperation of the user can be reduced.

Figure 7:
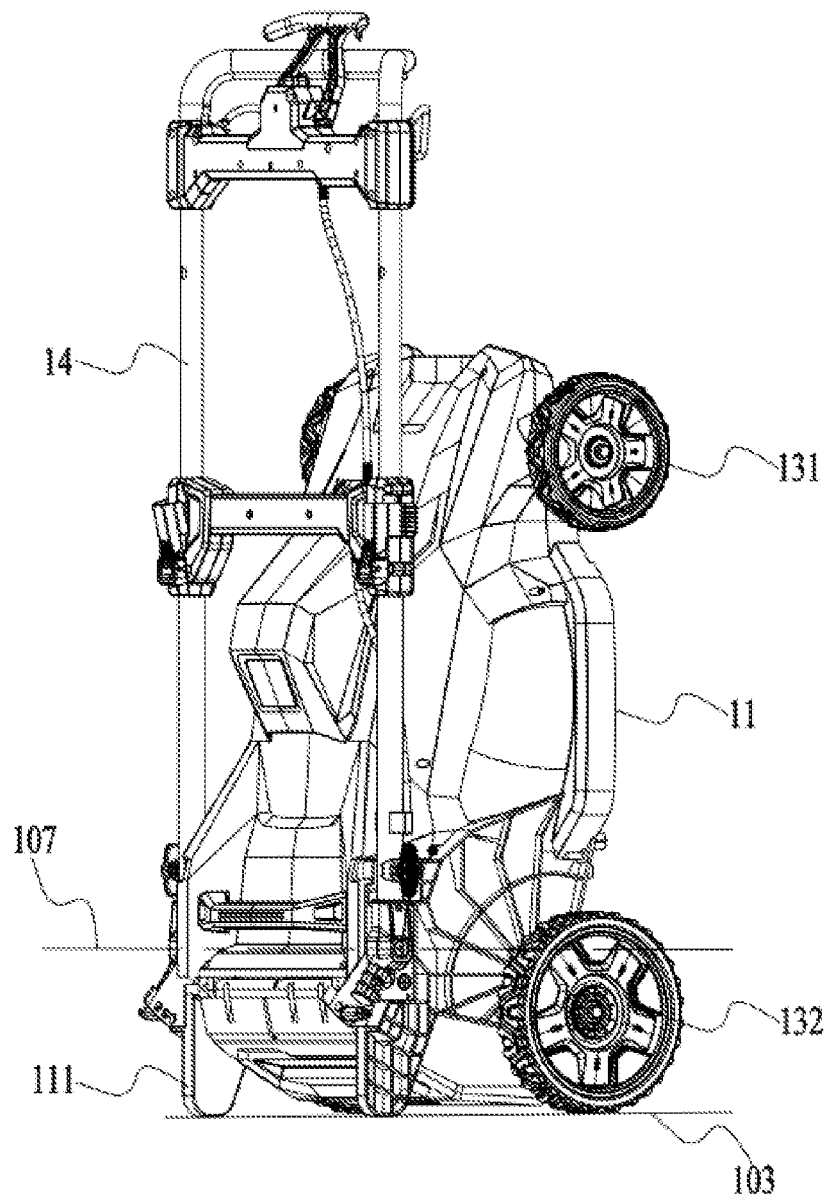
FIG. 7 is a perspective view of the mower of FIG. 1 with the operating assembly folded.

As shown in FIG. 7, when the user does not need to use the mower 100, the operating assembly 14 can be rotated to the front side of the mower 100 around the first rotational shaft 107. At this time, the operating assembly 14 and the main machine body 11 of the mower 100 are at least partially coincident in a first plane 102 where the first linear direction 101 is located so that a size of the whole mower 100 is reduced and the folding of the mower 100 is completed. In one example, the first plane 102 is located in a plane where the forward-backward direction intersects the left-right direction and perpendicular to an up-down direction. In this example, the mower 100 is further formed, at a position close to the first rotational shaft 107, with a support leg 111 for supporting the mower 100, and the support leg 111 extends from the main machine body 11 to the back side to form a protrusion portion. One or more protrusion portions are provided. A length of the protrusion portion extending to the back side is substantially flush with a size of a backmost side of the second walking wheel 132 in a second plane 103 perpendicular to the first plane 102, that is, in the up-down direction, there is at least one straight line that can pass through both a point at a backmost end of the support leg 111 and a point at a backmost end of the second walking wheel 132. In this case, the straight line is also a tangent to the point at the backmost end of the second walking wheel 132. The support leg 111 is formed with at least a support surface on the second plane 103 perpendicular to the forward-backward direction, and the support surface is a continuous plane and located at a backmost end of the protrusion portion.

In this example, two support legs 111 are provided and integrally formed with the main machine body 11, and the two support legs 111 are disposed corresponding to two second walking wheels 132, respectively. After the user completes the folding of the mower 100, the whole mower 100 is set upright, that is, the mower 100 is rotated by 90° counterclockwise with the second walking wheel 132 as a center so that the whole machine originally located in the forward-backward direction rotates to the up-down direction. In this case, the support legs 111 and the second walking wheels 132 cooperate with each other to form four support portions of the mower 100 so that the mower 100 can be stably placed on any plane. In this manner, the mower 100 can be placed in a narrower vertical space after the folding of the mower 100 is completed, thereby saving the storage space. In one example, the support legs 111 are integrally formed with the main machine body 11 and extend from the main machine body 11 so that the assembly process of the mower 100 can be effectively reduced, and the additional labor cost for mounting the support legs 111 and the cost for mounting related attachments can be reduced. Finally, the production and assembly costs of the mower 100 can be reduced as a whole.

Figure 8:
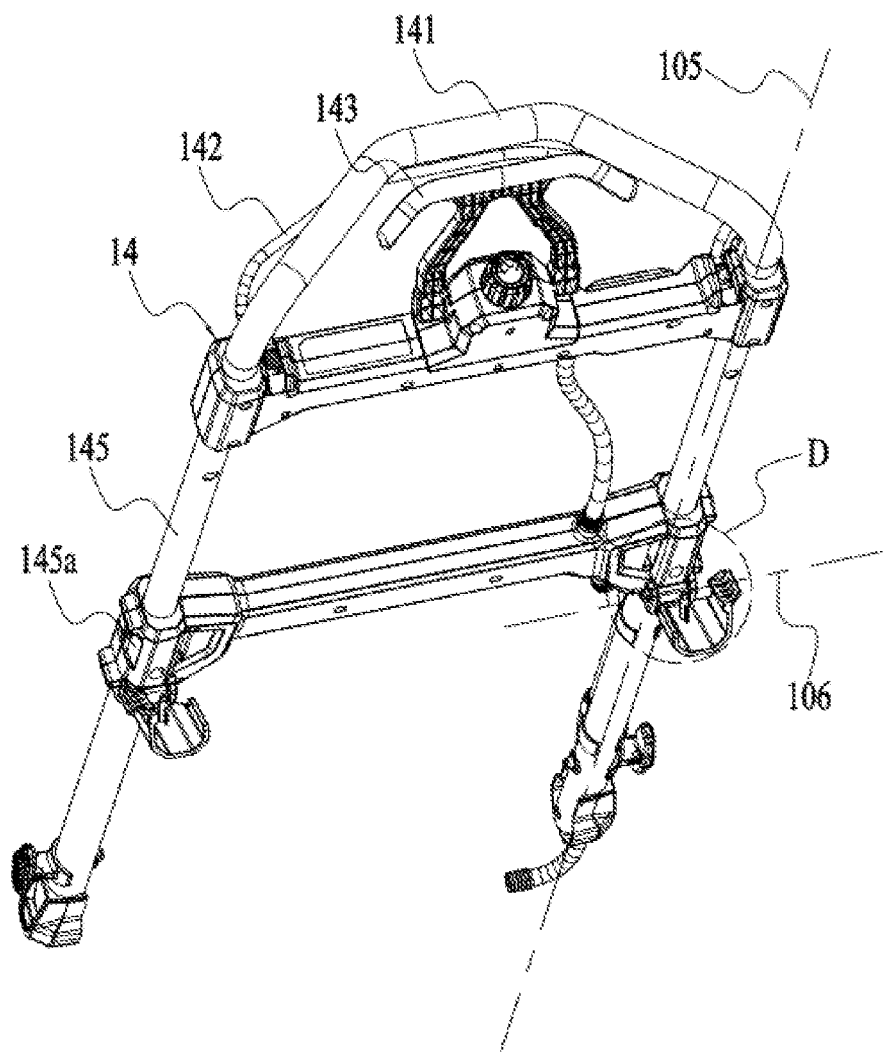
FIG. 8 is a perspective view of the operating assembly of the mower of FIG. 1.
Figure 9:
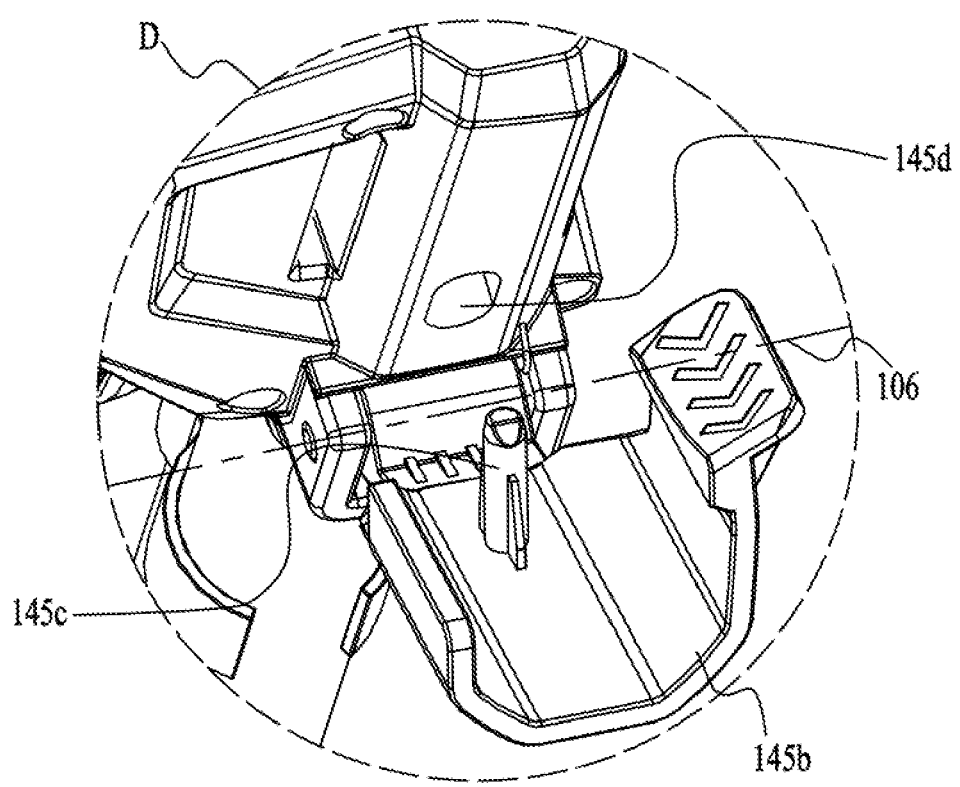
FIG. 9 is a partial enlarged view of a part D of the mower of FIG. 8.

As shown in FIGS. 8 to 9, the connecting rod 145 connects the handle assembly 141, the first operating member 142, and the second operating member 143 to the main machine body 11. The connecting rods 145 are distributed on a left side and a right side of the main machine body 11 and extend in a second linear direction 105 parallel to an axis of the connecting rod. The middle part of the connecting rod 145 is further provided with a telescopic portion 145a, and the telescopic portion 145a is adjusted by an adjusting member 145b. When the adjusting member 145b is separated from the telescopic portion 145a, the connecting rod 145 can be freely extended or shortened; and when the adjusting member 145b is inserted into the telescopic portion 145a, the connecting rod 145 cannot be extended or shortened. In this example, the adjusting member 145b has a rotational shaft perpendicular to or intersecting the axis of the connecting rod 145. The adjusting member 145b may be a snap structure and can freely rotate about a rotation axis 106 of the rotational shaft. The adjusting member 145b is further provided with a bolt 145c, and the bolt 145c can be inserted into or separated from a limiting hole 145d on the telescopic portion 145a so as to control the extension and retraction of the connecting rod 145. In fact, the rotational shaft may be disposed at any end of the limiting hole 145d in the second linear direction 105. When the mower 100 is in the folding state shown in FIG. 7, it can be defined that the rotational shaft may be disposed on the front side or the back side of the limiting hole 145d, and the adjusting member 145b can freely rotate in the free state. In this example, the adjusting member 145b is disposed at the back side of the limiting hole 145d. In this manner, when the user pulls the adjusting member 145b, the adjusting member 145b is quickly separated from the telescopic portion 145a under the action of gravity so that the telescopic function is achieved. When the connecting rod 145 is adjusted to a preset length, the adjusting member 145b can be grasped in the second linear direction 105 so that the adjusting member 145b is fixed to the telescopic portion 145a by the snap structure between the adjusting member 145b and the telescopic portion 145a. In this example, the adjusting member 145b is formed with a connection hole for being connected to the rotational shaft, a torsion spring (not shown in the figure) is further disposed in the connection hole, and the torsion spring has a pre-tightening force. In this manner, when the user pulls the adjusting member 145b, the adjusting member 145b can be quickly separated from the telescopic portion 145a under the combined action of the torsion spring and the gravity so that the user experience is better.

As shown in FIGS. 10 to 13, in order to effectively control the mower 100, the main machine body 11 is further provided with an electronic component 115, and the electronic component 115 is electrically connected to the power output assembly 12, the operating assembly 14, and the power supply device 15 separately. The main machine body 11 is further formed with a first accommodation space 112 for accommodating the electronic component 115 and a second accommodation space 113 for accommodating the motor 122, and the first accommodation space 112 communicates with the second accommodation space 113. In order to prevent the grass chips and the dust from entering the electronic component 115 and the electric motor, the mower 100 further includes a seal plate 114 configured to seal at least a portion of the first accommodation space 112 and the second accommodation space 113, and the seal plate 114 and the main machine body 11 are fixedly connected to each other or integrally formed.

Figure 10:
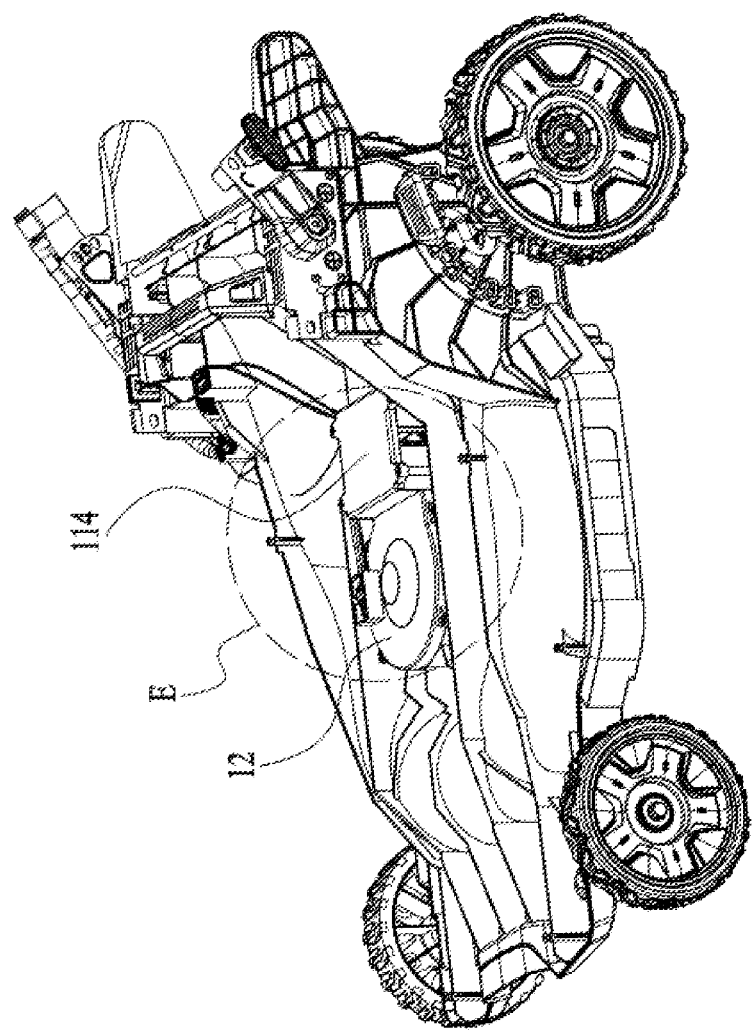
FIG. 10 is a perspective view of the mower of FIG. 1 with the operating assembly and a part of a housing removed.
Figure 11:
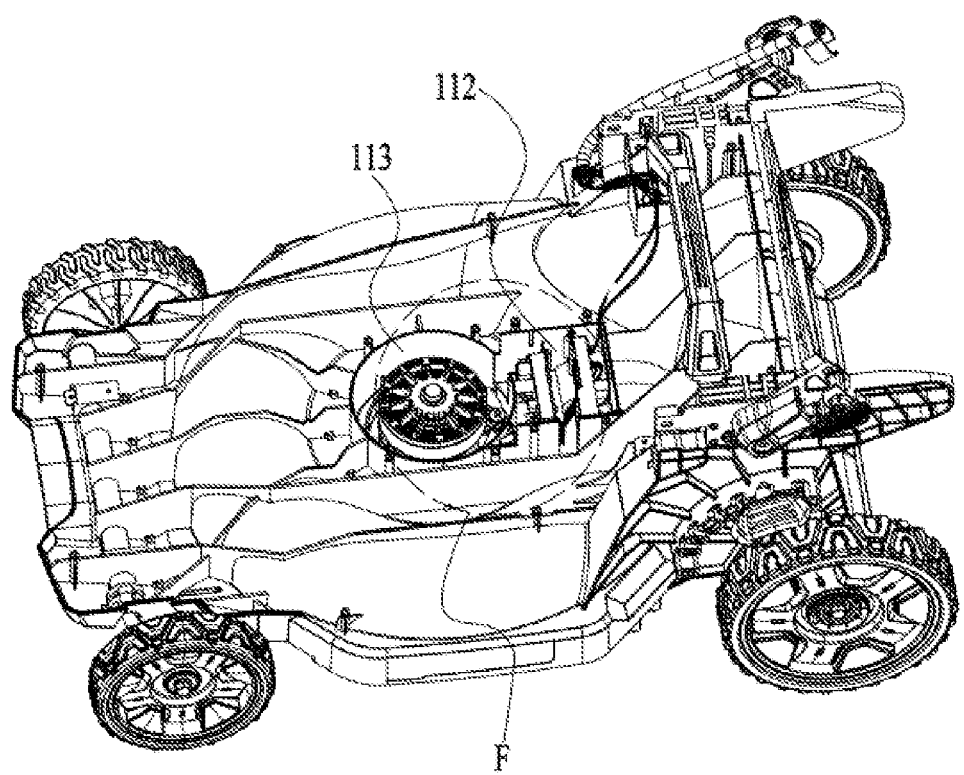
FIG. 11 is a perspective view of the mower of FIG. 6 with a seal plate removed.
Figure 12:
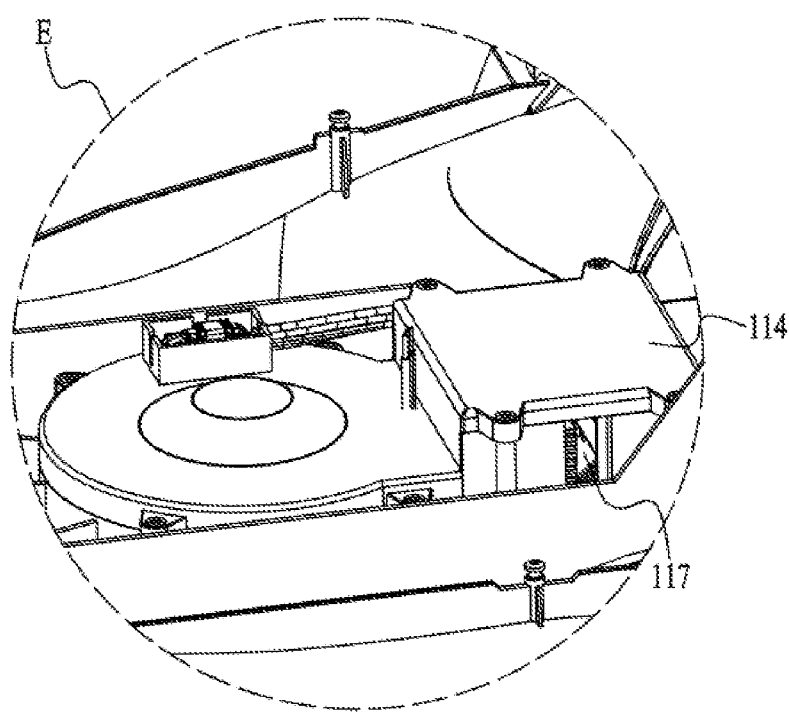
FIG. 12 is a partial enlarged view of a part E of the mower of FIG. 10.
Figure 13:
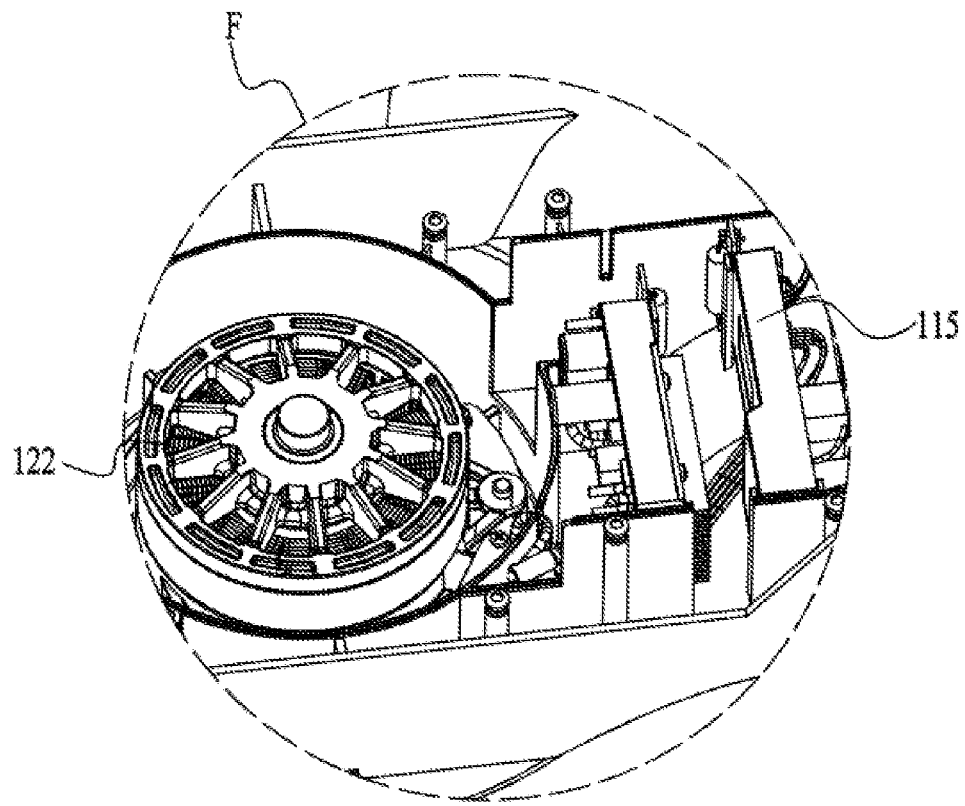
FIG. 13 is a partial enlarged view of a part F of the mower of FIG. 11.

In one example, the electronic component 115 and motor 122 generate more heat during operation. In order to maintain the continuous and effective operation of the mower 100, it is necessary to efficiently dissipate heat from the electronic component 115 and the motor 122. In this example, the motor 122 is a brushless electric motor of an outer rotor type. The motor 122 satisfies the power output and a volume of the second accommodation space 113 for accommodating the motor can be reduced due to a small volume of the motor, and the motor enables the structures of other components cooperating with the motor to be more compact so that the size of the whole machine can be more compact, and the size of the whole machine can be selectively reduced. As shown in FIGS. 10-12 an air inlet 117 for ventilation is further formed between the seal plate 114 and the main machine body 11. The air inlet 117 is disposed at a side edge of the seal plate 114. As shown in FIG. 11, the electronic components 115 are distributed at two ends of the first accommodation space 112 and cooperate with the air inlet to form a passage for heat dissipation wind to enter. The passage divides the first accommodation space 112 into two parts, and the electronic components 115 are respectively distributed in the two parts. On one hand, it is beneficial to the flow of heat dissipation wind and an increase in the heat dissipation efficiency; and on the other hand, a plurality of electronic components 115 are prevented from influencing each other due to heat dissipation with each other. In fact, the air inlet 117 and the electronic component 115 are not limited to the arrangement form in this example. The air inlet 117 may be disposed within any range of the first accommodation space 112 that is ventilable, such as the back side of the first accommodation space 112.

As shown in FIG. 14, in order to effectively dissipate heat from the electronic component 115 and the electric motor, a first fan 123 is disposed between a lower side of the electric motor and the mowing element 121, and the motor rotates to drive the first fan 123 to rotate for forming the heat dissipation wind. The heat dissipation wind can enter the first accommodation space 112 from the air inlet 117 and takes away the heat of the electronic component 115 when flowing through the electronic component 115 and flows out to the electric motor in the second accommodation space 113, and after the heat dissipation wind passes through the motor, the heat of the motor is taken away and exhausted from the lower side of the electric motor to complete the heat dissipation. The main machine body 11 is formed with an air outlet 118 for the heat dissipation wind to flow out and at a position where the first fan 123 is connected to the electric motor. In addition, since the first accommodation space 112 communicates with the second accommodation space 113, during the formation of a heat dissipation air path, heat generated by both the electronic component 115 and the electric motor can be effectively dissipated so that the arrangement structures of internal components of the mower 100 are simplified, and the heat dissipation efficiency is improved so that the mower 100 can work continuously and effectively. In addition, a heat dissipation device configured to dissipate heat from the electronic component 115 is avoided so that the heat dissipation cost is reduced.

Figure 15:
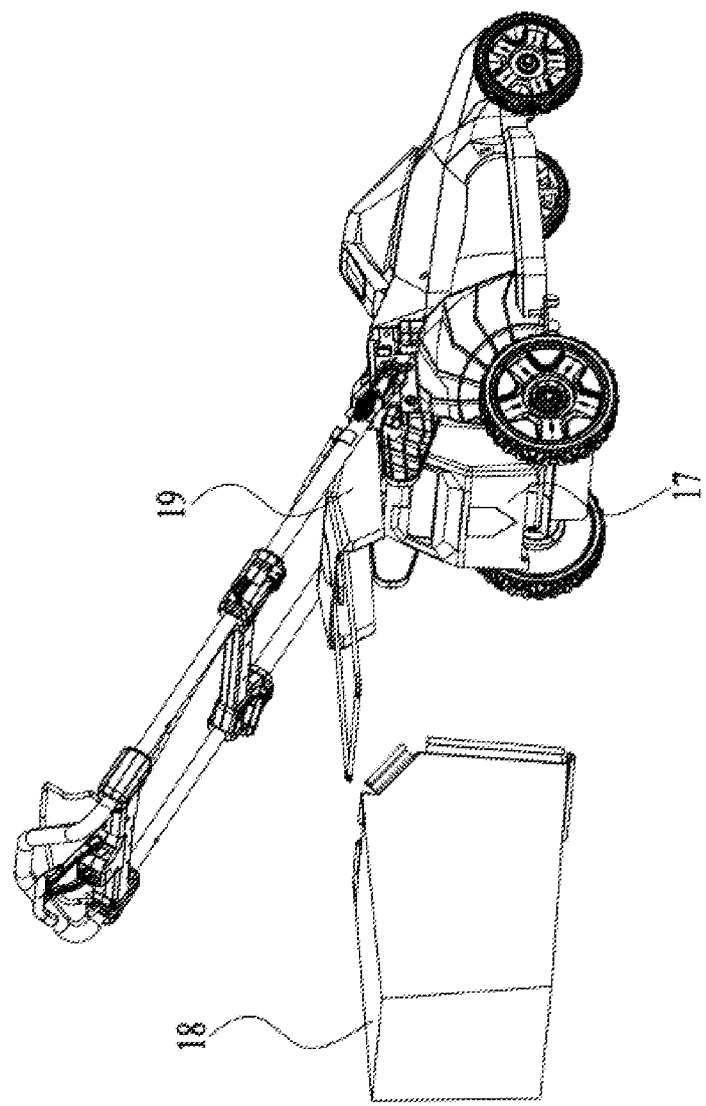
FIG. 15 is an exploded schematic view of the mower of FIG. 1 with a grass collecting basket disassembled.
Figure 16:
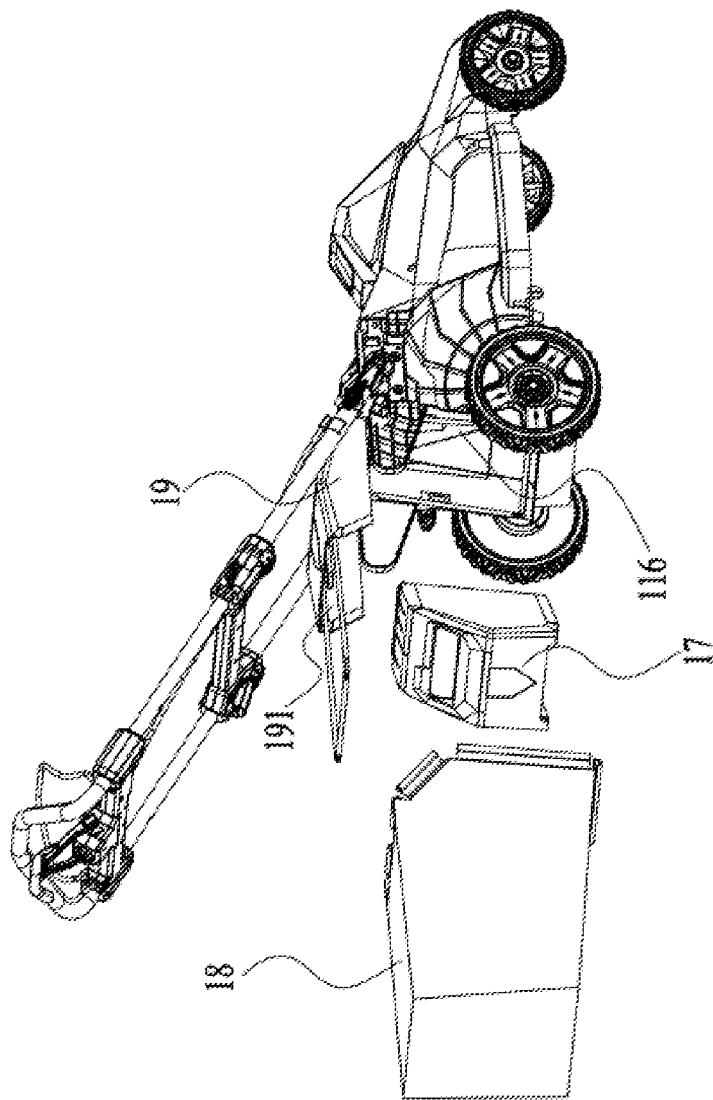
FIG. 16 is an exploded schematic view of the mower of FIG. 1 with the grass collecting basket and a back cover disassembled.
Figure 17:
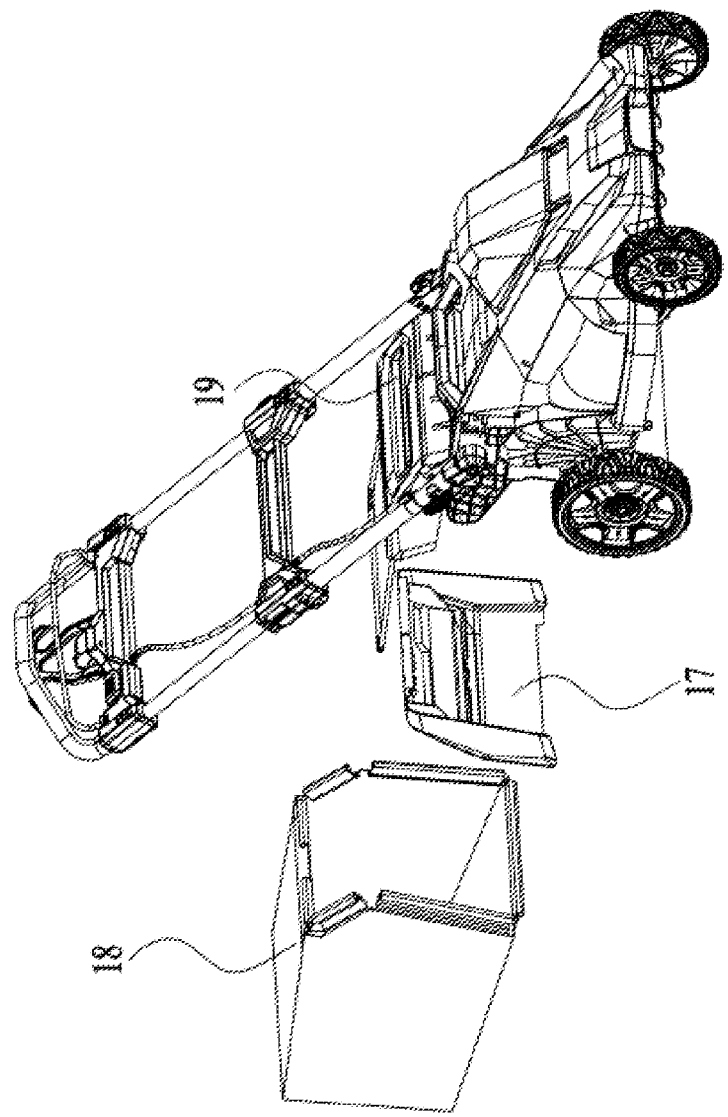
FIG. 17 is an exploded schematic view of the mower of FIG. 1 with the grass collecting basket and the back cover disassembled from another viewing angle.

In this example, the mower 100 further includes a grass collecting mode and a grass chopping mode. As shown in FIGS. 15 to 17, the mower 100 includes a back cover 17 and a grass collecting basket 18. When the mower 100 is in the grass chopping mode, the back cover 17 is mounted to a back outlet 116. In this case, the grass chips are directly chopped by the mowing element 121 and fall from a lower side of the mowing element 121. When the mower 100 is in the grass collecting mode, the back cover 17 is removed, and the grass collecting basket 18 is mounted to the back outlet 116 in this case; and the mower 100 automatically stores the grass chips during the mowing process. The grass collecting basket 18 is connected to the main machine body 11 of the mower 100 through an attachment. The mower 100 includes a dust cover 19, and the dust cover 19 cooperates with the grass collecting basket 18 so that the grass chips will not leak out from an interface between the grass collecting basket 18 and the dust cover 19 when the grass chips are discharged from the back outlet 116.

Figure 18:
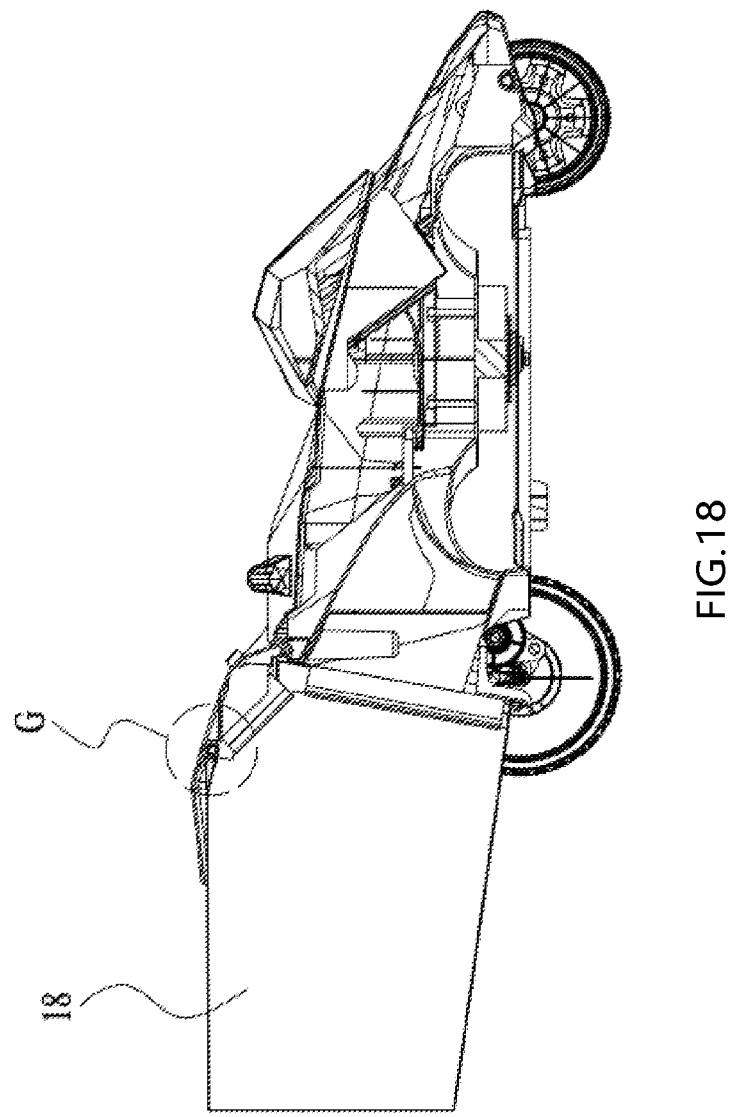
FIG. 18 is a partial sectional view of the mower of FIG. 1 with the operating assembly removed.
Figure 19:
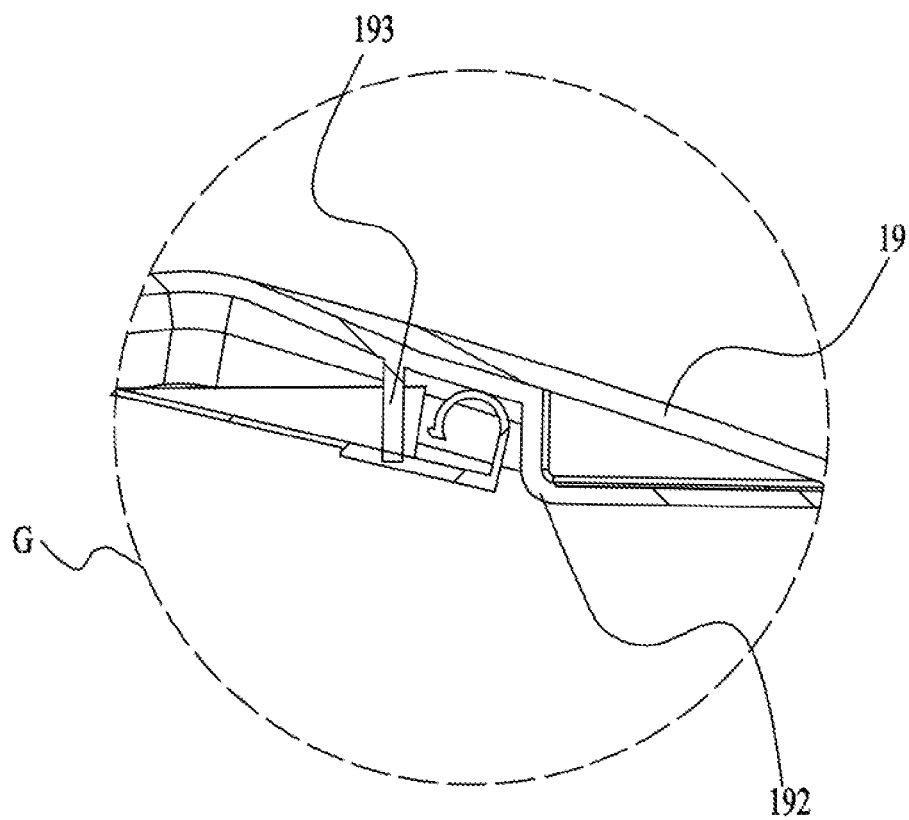
FIG. 19 is a partial enlarged view of a part G of the mower of FIG. 18.

As shown in FIGS. 18 to 19, in this example, in order to more effectively reduce the leakage of grass chips from the interface 191 between the grass collecting basket 18 and the dust cover 19, a guide portion 192 and a first stop portion 193 are further disposed at the dust cover 19. The guide portion 192 is recessed from an outer wall to an inner wall of the dust cover 19, that is, a protrusion is formed on the inner wall of the dust cover 19, and the protrusion extends substantially in a grass discharging direction and protrudes from the interface 191 between the dust cover 19 and the grass collecting basket 18. When the mower 100 is in the grass collecting mode, the grass chips are quickly discharged from the back outlet 116 and discharged into the grass collecting basket 18 along at least a portion of the dust cover 19. During this period, the grass chips are discharged along at least a portion of the inner wall of the dust cover 19 and are guided to a direction away from the interface 191 when moving to the guide portion 192 so that the grass chips are prevented from entering the interface 191 and discharged from the interface 191. In order to prevent a small amount of grass chips from entering the interface 191 and being discharged outward from the interface 191 under the guidance of the guide portion 192, the dust cover 19 is further provided with the first stop portion 193 at the back side of the interface 191. The first stop portion 193 substantially isolates the communication between the interface 191 and the outside so that the grass chips can be prevented from being discharged from the interface 191 to the outside of the grass collecting basket 18.

Figure 20:
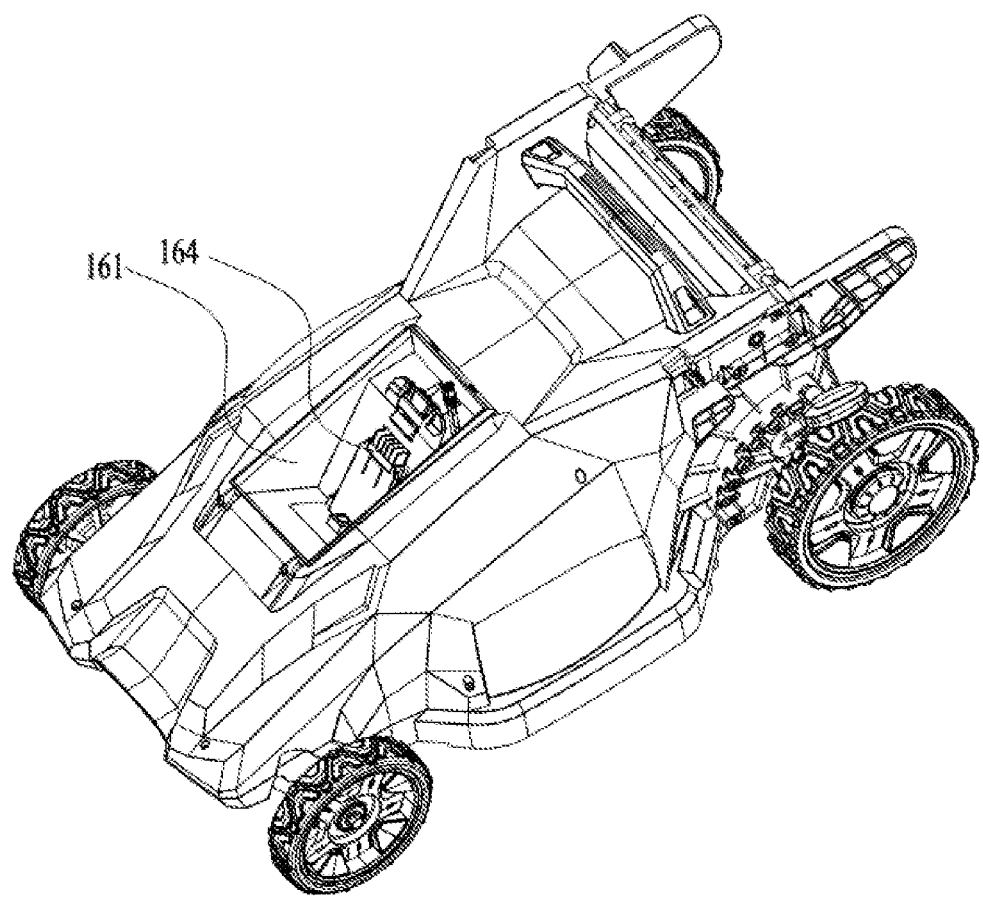
FIG. 20 is a perspective view of the mower of FIG. 1 with the grass collecting basket and the operating assembly removed.
Figure 21:
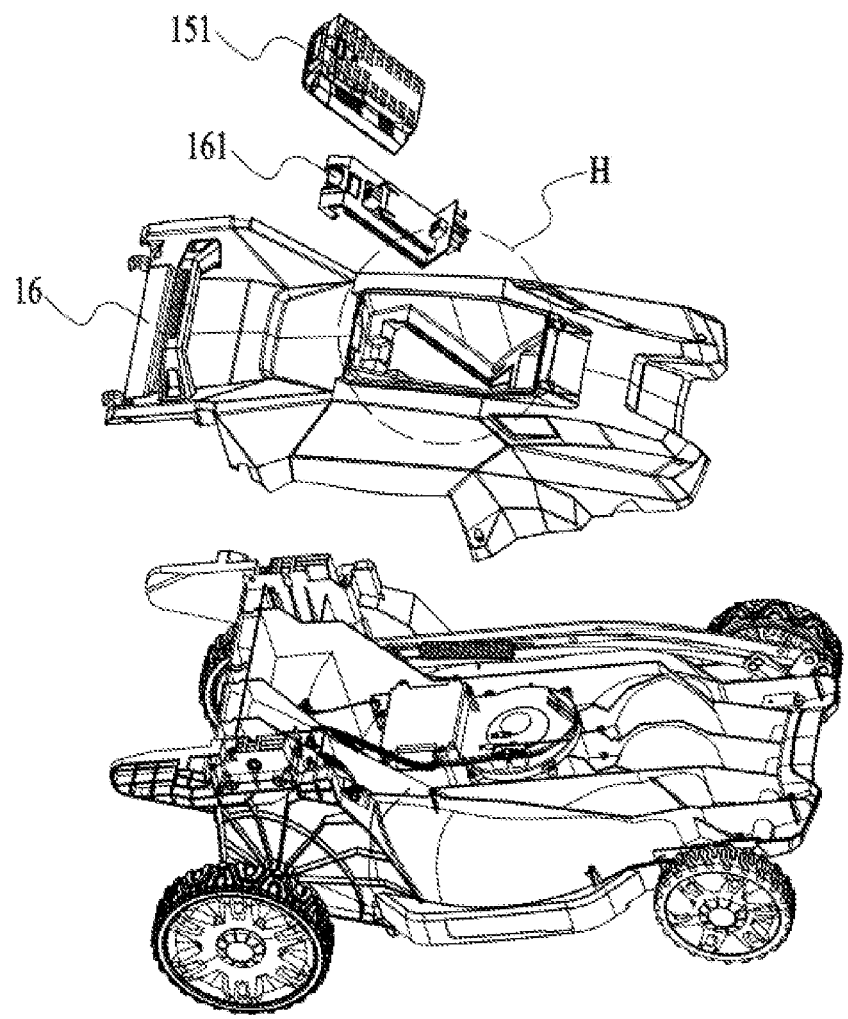
FIG. 21 is an exploded schematic view of the mower of FIG. 20 with the grass collecting basket and the operating assembly removed.
Figure 22:
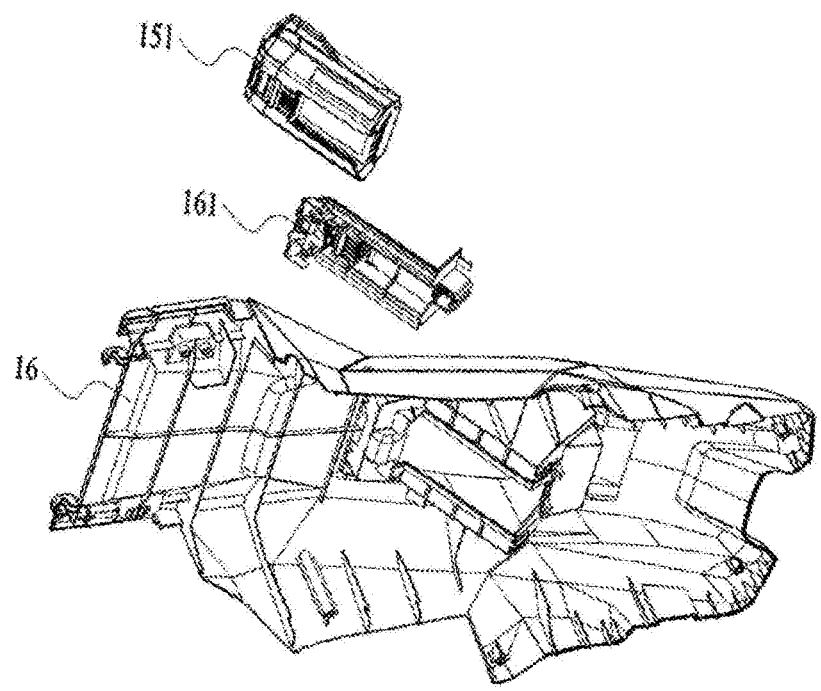
FIG. 22 is an exploded schematic view of an upper housing of the mower of FIG. 21.

As shown in FIGS. 20 to 22, the mower 100 further includes a mounting seat 161 for the battery pack 151 to be mounted. The mounting seat 161 is slidably connected to an upper housing 16. The upper housing 16 is disposed on an upper side of the main machine body 11 and can be mounted to the main machine body 11 by a fixing member. The mounting seat 161 is connected to a power supply interface 164, and the power supply interface is configured to be electrically connected to the battery pack 151. When the battery pack 151 is connected to the power supply interface 164, the battery pack 151 can provide energy for the mower 100 to drive the electric motor to rotate.

Figure 23:
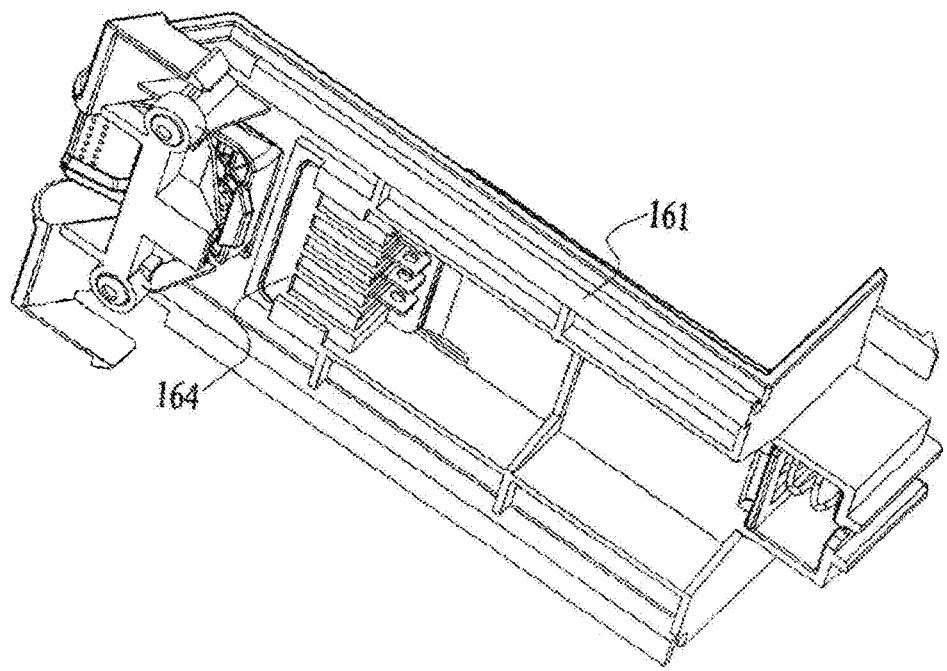
FIG. 23 is a perspective view of a mounting seat of the mower of FIG. 22.
Figure 24:
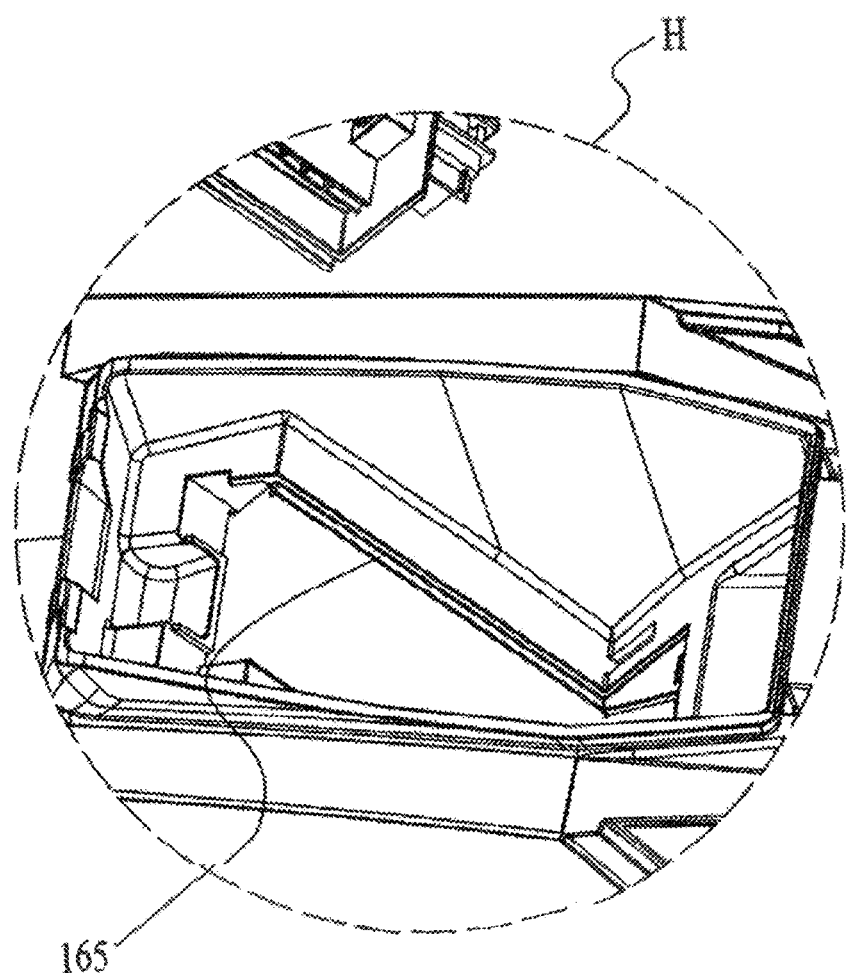
FIG. 24 is a partial enlarged view of a part H of the mower of FIG. 21.
Figure 25:
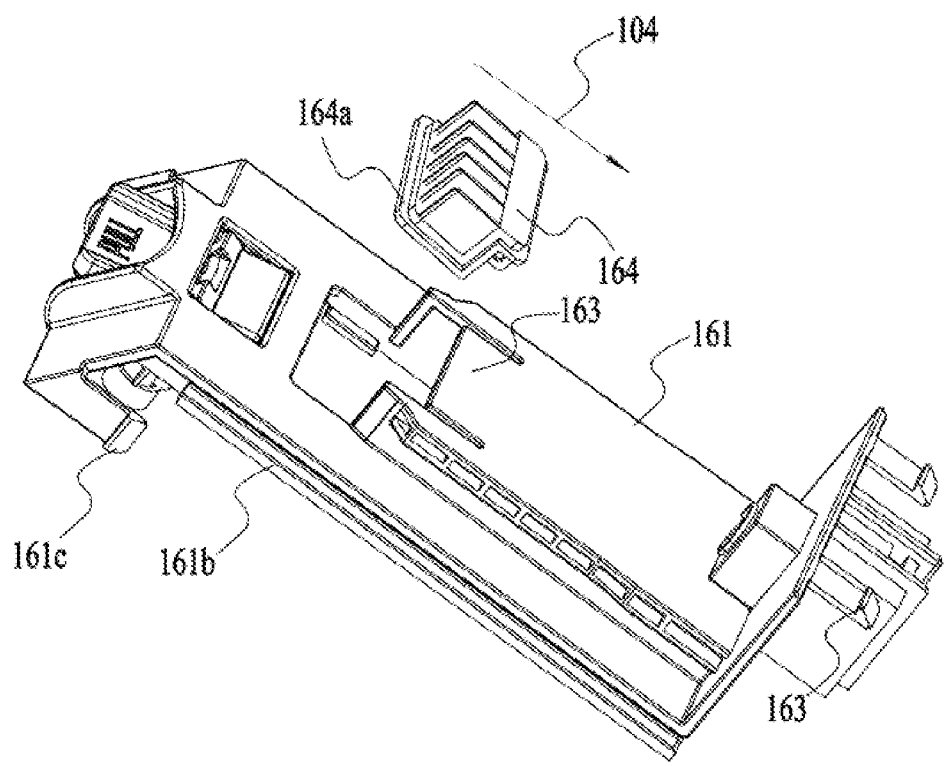
FIG. 25 is an exploded schematic view of the mounting seat of the mower of FIG. 1.

As shown in FIGS. 23 to 25, in this example, the mounting seat 161 is formed with a slide rail 161*b* connected to the upper housing 16, and the upper housing 16 is formed with a guide rail 165 that cooperates with the slide rail 161*b* to move. The mounting seat 161 slides into the slide rail 161*b* through the guide rail 165 so as to be integrally connected to the upper housing 16. The mounting seat 161 is further formed with a third limiting portion 161*c* for limiting. The third limiting portions 161*c* are disposed at two ends of the mounting seat 161 in a sliding direction of the mounting seat 161, respectively. The mounting seat 161 adopts a connection mode of a separate type so that the mechanism strength of the mounting seat 161 can be increased. When the mounting seat 161 is connected to the battery pack 151, a surface of the mounting seat 161 is worn while carrying the battery pack 151. Therefore, the local strength of the mounting seat 161 needs to be increased.

Figure 26:
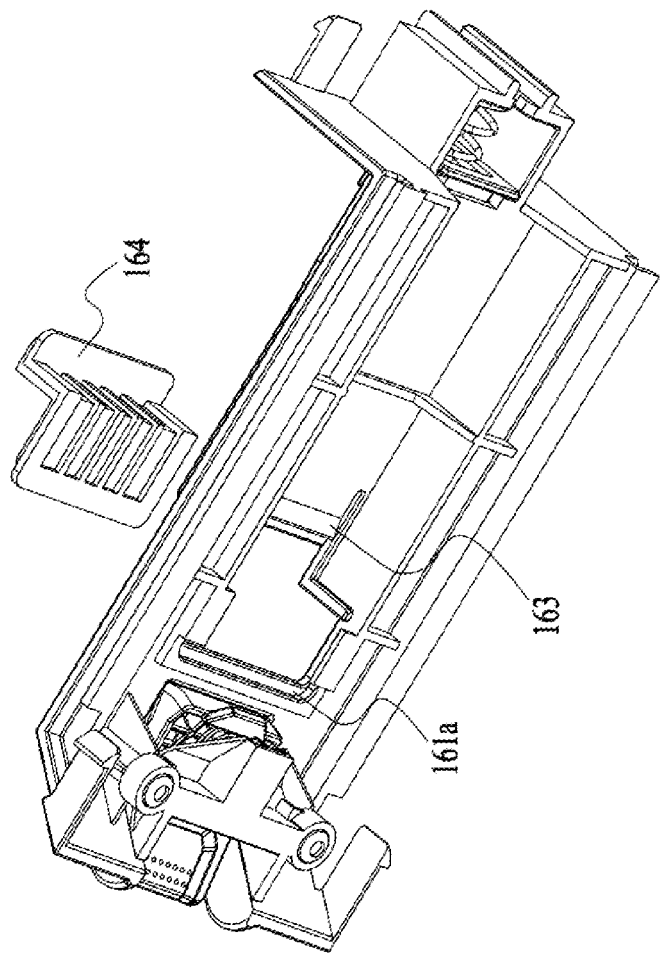
FIG. 26 is an exploded schematic view of the mounting seat of the mower of FIG. 25 from another viewing angle.

As shown in FIGS. 25 to 26, the mounting seat 161 is formed with a first mounting groove 162 and an engagement structure for engaging with the power supply interface 164 so that the power supply interface 164 is avoided from being fixed to the mounting seat 161 by other attachments.

The power supply interface 164 is formed with a first engagement portion 164*a*, and the first engagement portion 164*a* has a stepped shape. The mounting seat 161 is formed with a second engagement portion 161*a*, and the second engagement portion 161*a* also has a stepped shape. The second engagement portion 161*a* cooperates with the first engagement portion 164*a* so that the displacement of the power supply interface 164 in the up-down direction can be limited. The mounting seat 161 is further formed with a second stop portion 163. The second stop portion 163 has a preset elastic force. When the power supply interface 164 slides in a first direction 104 shown in the figure, the second engagement portion 161*a* cooperates with the first engagement portion 164*a* to limit the displacement of the power supply interface 164 in the up-down direction, that is, two steps of the second engagement portion 161*a* and the first engagement portion 164*a* engage with each other, and meanwhile, the power supply interface 164 presses the second stop portion 163; and after the power supply interface 164 enters the first mounting groove 162, the second stop portion 163 is reset to limit the power supply interface 164 from moving in a direction away from the first direction 104 shown in the figure. In this case, the power supply interface 164 is fixed to the mounting seat 161.

Figure 27:
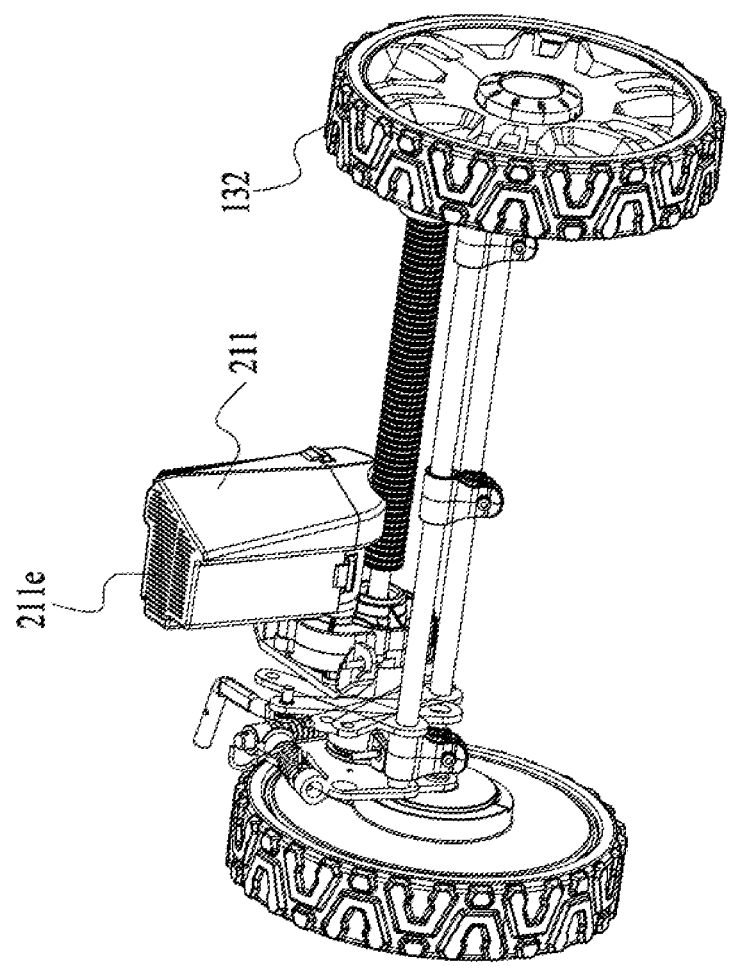
FIG. 27 is a perspective view of a self-propelled electric motor driving a second walking wheel of the mower of FIG. 1.

As shown in FIG. 27, the mower 100 further includes a second electric motor 21 capable of driving the mower 100 to walk by itself. The second electric motor 21 may be configured to drive the first waling wheel 131 or the second walking wheel 132. In this example, the second electric motor 21 is configured to drive the second walking wheel 132. The second walking wheel 132 is disposed on the back side of the mower 100, a large amount of grass chips or dust is generated in the mowing process of the mower 100, the second electric motor 21 is disposed at a position independent of the main machine body 11, and the second electric motor 21 is closer to the grass chips and the dust in a process in which the second electric motor 21 drives the second walking wheel 132 to rotate, so the grass chips and the dust have greater influence on the second electric motor 21. In this example, the second electric motor 21 is disposed in a separate housing 211 connected to a second fan 212 for blowing out the heat dissipation wind.

Figure 28:
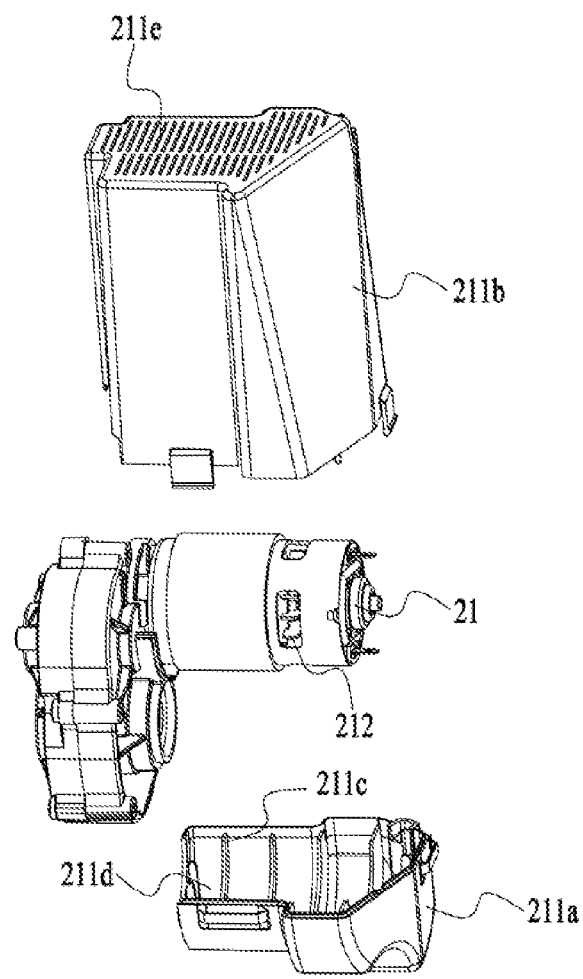
FIG. 28 is an exploded schematic view of the self-propelled electric motor of the mower of FIG. 26.
Figure 29:
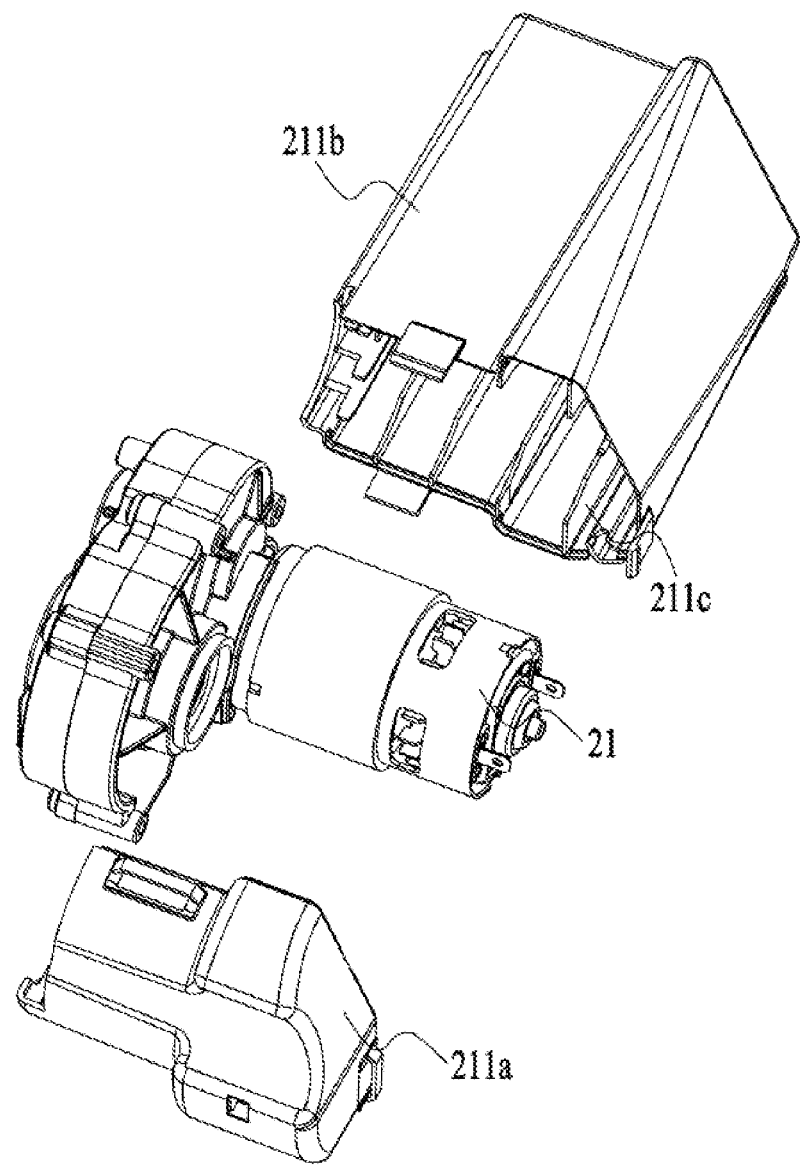
FIG. 29 is an exploded schematic view of the self-propelled electric motor of the mower of FIG. 26 from another viewing angle.
Figure 30:
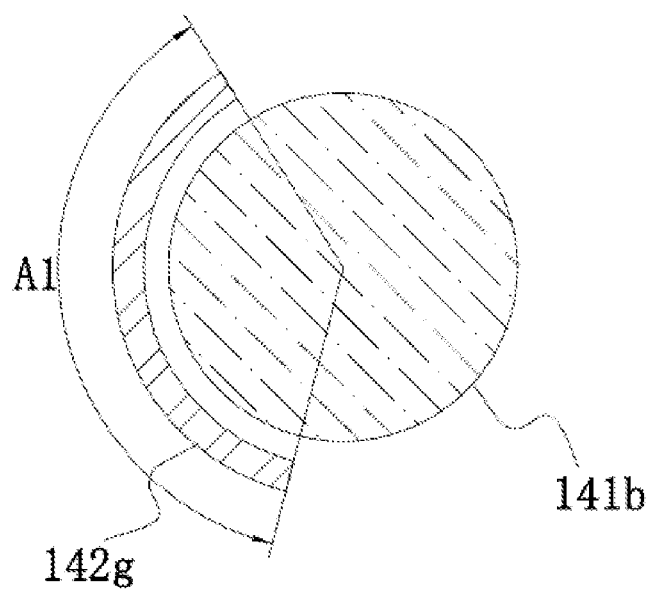
FIG. 30 is a cross-sectional view of the hold portion and the first operating member in FIG. 1.

As shown in FIGS. 28 to 29, the housing 211 includes a first housing portion 211*a* and a second housing portion 211*b*, where the first housing portion 211*a* is formed with or connected to a second mounting groove 211*d* for the second electric motor 21 to be mounted, and heat dissipation ribs 211*c* are distributed in the second mounting groove 211*d*. In one example, the heat dissipation ribs 211*c* protrude from a surface of the first housing portion 211*a* so that the second mounting groove 211*d* is formed. On the one hand, the heat dissipation ribs 211*c* can fix the second electric motor 21; and on the other hand, the heat dissipation ribs 211*c* can transfer heat from the electric motor. The second housing portion 211*b* is configured to cooperate with the first housing portion 211*a* to seal a space where the electric motor is located, and a volume of a third accommodation space formed by the second housing portion 211b and the first housing portion 211a is greater than a volume of the second electric motor 21. In this manner, when the electric motor generates heat, a large amount of heat is distributed in the third accommodation space, self-circulation can be formed in the third accommodation space, and finally the heat is dissipated through the heat exchange between a housing wall of the housing 211 and the outside. The housing 211 further includes a heat dissipation hole 211e for heat dissipation. The heat dissipation holes 211e are disposed at merely one position of the housing 211 and continuously distributed, and there is no dividing member dividing the heat dissipation holes 211e into two or more parts. The heat dissipation holes 211e allow the heat in the third accommodation space to quickly dissipate and the faster heat exchange can be generated between the heat dissipation holes and the outside. Since the heat dissipation holes 211e are disposed merely at one preset position of the housing 211, no gas flow occurs in the third accommodation space. In this case, air flows in or out merely through the heat dissipation holes 211e. The air entering and leaving through a same one heat dissipation hole can merely flow in or out in the form of heat exchange and an airflow with a relatively fast flow rate cannot be formed. In this manner, the chips or dust outside the housing 211 can be effectively prevented from being brought into the third accommodation space by the airflow and thus the service life of the second electric motor 21 can be avoided from being affected. In addition, due to the blowing action of the second fan 212, the airflow in the third accommodation space runs rapidly so that the rate of the heat exchange between the airflow and the outside can be accelerated, and the heat exchange efficiency can be increased. An inner side of the second housing portion 211b is further formed with or connected to heat dissipation ribs 211c. On the one hand, the heat dissipation ribs 211c can increase the structural strength of the housing 211; and on the other hand, the heat dissipation ribs can increase an area of an inner surface of the housing 211, thereby increasing the rate of the heat exchange between the third accommodation space and the outside. The third accommodation space formed by the housing 211 may communicate with the outside through the heat dissipation holes 211e at one position or may be completely isolated from the outside. When the surface of the housing 211 is completely sealed, the heat generated by the second electric motor 21 is mainly dissipated through the heat exchange between the housing 211 and the outside. When the surface of the housing 211 is completely sealed or merely heat dissipation holes 211e at one position are left, the second electric motor 21 is substantially isolated in a closed space, and external grass chips and dust are substantially not allowed to enter the second electric motor 21. Therefore, the service life of the second electric motor 21 is greatly prolonged, and the daily maintenance of the second electric motor 21 is more simplified.

Figure 31:
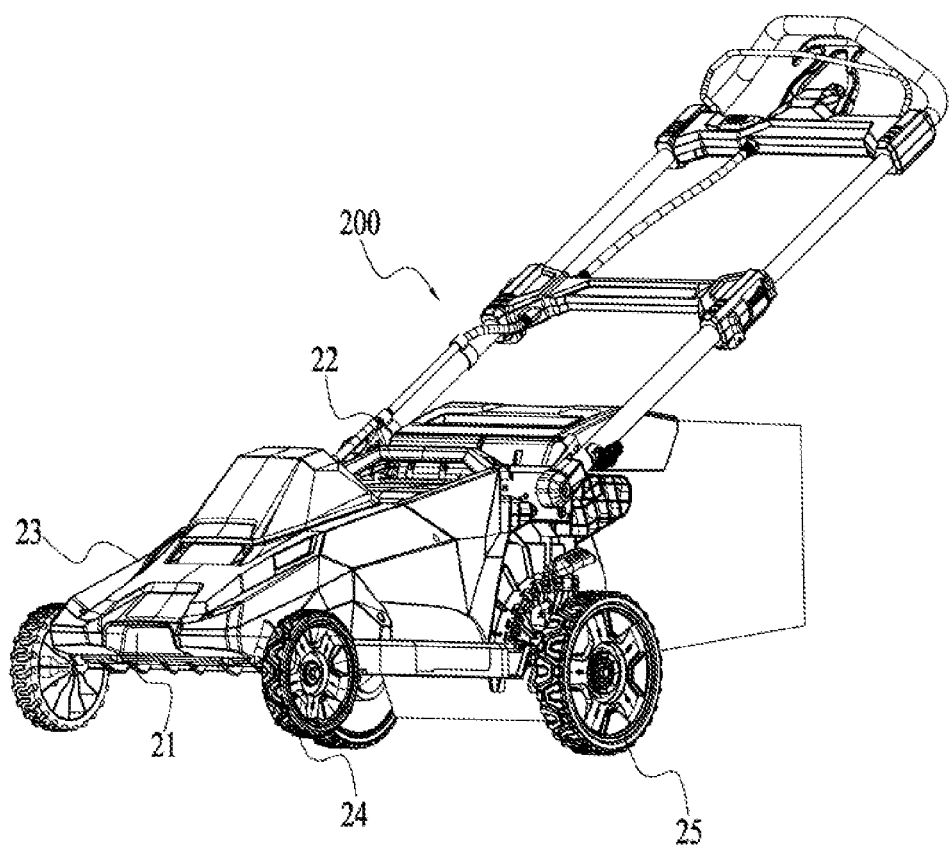
FIG. 31 is a perspective view of a mower according to a second example.

FIG. 31 shows a mower 200 according to a second example. The portion of the mower of the first example adaptive to this example can be applied to this example, and merely the differences between this example and the first example will be described below.

In this example, the mower 200 further includes a front handle 22 and a back handle 23 for transportation. The front handle 22 is disposed on the main machine body 24 and disposed at the front end of the whole mower 200. The front handle 22 is disposed at a middle position of the main machine body 24 sandwiched between first walking wheels 25. The front handle 22 is a protrusion or a groove formed by or connected to the main machine body 24, the protrusion or the groove can be held and has a preset support ability. The back handle 23 is disposed at the back end of a cutting machine and disposed at a middle position of the main machine body 24 sandwiched between the second walking wheels 26. The back handle 23 may be a grip connected to or formed by the main machine body 24. In this manner, when the user transports the mower 200, the user can transport the mower 200 by holding the front handle 22 and the back handle 23.

What is claimed is:

1. A mower, comprising:
   an electric motor configured to drive a mowing element to rotate for mowing;
   a main machine body configured for the electric motor to be mounted and configured to extend in a forward-backward direction;
   an electronic component electrically connected to the electric motor and configured to control power output of the mower; and
   an operating assembly operable for control of walking and the power output of the mower,
   wherein the operating assembly comprises a handle assembly rotatably connected to the main machine body and configured to be held to operate the mower to run and a first operating member rotatably connected to the handle assembly to control a walking state of the mower formed with a fitting surface adapted to substantially fit flush with the handle assembly when the first operating member is operated to rotate and approach the handle assembly, and
   wherein the first operating member comprises a contact portion having a bent region and a straight line region and an included angle is formed between an extension direction of the bent region and an extension direction of the straight line region.

2. The mower of claim 1, wherein the fitting surface is disposed at the contact portion, the handle assembly comprises a hold portion, and in response to the fitting surface being in contact with the handle assembly, the fitting surface fits with the hold portion.

3. The mower of claim 1, wherein the included angle is greater than or equal to 20° and less than or equal to 30°.

4. The mower of claim 1, wherein the handle assembly comprises two connecting rods and a connection housing connecting the two connecting rods and the contact portion is provided with the fitting surface and two main body portions for connecting the contact portion to the connection housing.

5. The mower of claim 4, wherein the operating assembly further comprises a speed regulator disposed between the two main body portions.

6. The mower of claim 5, wherein a length L3 of a portion of the speed regulator that can be operated is greater than or equal to 20 mm and less than or equal to 25 mm.

7. The mower of claim 2, wherein the fitting surface is an arc surface that can substantially fit with an outer surface of the hold portion.

8. The mower of claim 7, wherein the handle assembly comprises two connecting rods, the hold portion comprises an intermediate portion extending in a left-right direction, the intermediate portion is a cylinder, and a center line of the cylinder extends in the left-right direction, the hold portion further comprises a first connecting portion connected with the intermediate portion and one of the two connecting rods and a second connecting portion connected with an other one of the two connecting rods, the fitting surface comprises an intermediate fitting surface which is in contact with the hold portion, a first fitting surface and a second fitting surface arranged at both ends of the intermediate fitting surface, the first fitting surface is in contact with the first connecting portion, and the second fitting surface is which is in contact with the second connecting portion.

9. The mower of claim 8, wherein a cross-sectional line of the intermediate fitting surface in a plane perpendicular to the center line is a circular arc.

10. The mower of claim 9, wherein a center angle corresponding to the circular arc is greater than or equal to 30 degrees and less than or equal to 180 degrees.

11. The mower of claim 2, wherein the fitting surface is arranged on a back side of the hold portion.

12. The mower of claim 1, wherein the operating assembly further comprises a second operating member rotatably connected to the handle assembly and the second operating member is disposed on a front side of the first operating member.

13. The mower of claim 1, wherein the main machine body is further formed with a support leg configured to support the mower and the support leg is disposed at a back side of the main machine body.

14. The mower of claim 1, further comprising a walking assembly for the mower to walk wherein the walking assembly comprises a first walking wheel and a second walking wheel and the second walking wheel is disposed behind the first walking wheel.

15. The mower of claim 1, wherein the main machine body is further formed with a support leg configured to support the mower and the support leg is disposed at a back side of the main machine body, the mower further comprising a walking assembly for the mower to walk wherein the walking assembly comprises a first walking wheel and a second walking wheel and the second walking wheel is disposed behind the first walking wheel, and
 a backmost end of the support leg is substantially flush with a backmost end of the second walking wheel in a plane perpendicular to the forward-backward direction.

16. The mower of claim 1, wherein the operating assembly is rotatably connected to the main machine body and the main machine body is further formed with a first limiting portion for limiting rotation of the operating assembly.

17. The mower of claim 1, wherein the operating assembly further comprises a connection rod for connecting the handle assembly and the first operating member, the connection rod extends along a second linear direction parallel to an axis direction of the connection rod and is provided with a telescopic portion for adjusting a length of the connection rod the connection rod further comprises an adjusting member for adjusting a telescopic state, and the adjusting member is configured to rotate around a rotation axis perpendicular to the second linear direction.

* * * * *